United States Patent
Gupta et al.

(10) Patent No.: US 11,815,954 B2
(45) Date of Patent: Nov. 14, 2023

(54) METHOD AND ELECTRONIC DEVICE FOR PERFORMING OPERATION ON BASIS OF BENDING

(71) Applicant: Samsung Electronics Co., Ltd., Suwon-si (KR)

(72) Inventors: Vipul Gupta, Hisar (IN); Rahul Agrawal, Gwalior (IN); Ankur Agrawal, KamlaNagar (IN); Amit Agrawal, Gudhiyari (IN); Kalgesh Singh, New Delhi (IN); Saurabh Kumar, Patna (IN); Ashutosh Raghuvanshi, Jaunpur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/258,917

(22) PCT Filed: Jul. 10, 2019

(86) PCT No.: PCT/KR2019/008484
§ 371 (c)(1),
(2) Date: Jan. 8, 2021

(87) PCT Pub. No.: WO2020/013596
PCT Pub. Date: Jan. 16, 2020

(65) Prior Publication Data
US 2021/0325930 A1 Oct. 21, 2021

(30) Foreign Application Priority Data
Jul. 10, 2018 (IN) ............................ 201841025756
May 28, 2019 (KR) ........................ 10-2019-0062584

(51) Int. Cl.
*G06F 1/16* (2006.01)
*G06F 3/041* (2006.01)
(Continued)

(52) U.S. Cl.
CPC .......... *G06F 1/1652* (2013.01); *G06F 3/0412* (2013.01); *G06F 3/0482* (2013.01);
(Continued)

(58) Field of Classification Search
CPC .. G06F 1/1652; G06F 3/0412; G06F 3/04817; G06F 3/0482; G06F 3/147;
(Continued)

(56) References Cited

U.S. PATENT DOCUMENTS 6,668,179 B2 12/2003 Jiang
6,795,429 B1 9/2004 Schuster et al.
(Continued)

FOREIGN PATENT DOCUMENTS

JP 2018511867 A 4/2018
KR 10-2009-0026977 A 3/2009
(Continued)

OTHER PUBLICATIONS

International Search Report dated Oct. 23, 2019, issued in International Application No. PCT/KR2019/008484.
(Continued)

*Primary Examiner* — Sahlu Okebato
(74) *Attorney, Agent, or Firm* — Jefferson IP Law, LLP

(57) ABSTRACT

Provided is a method, performed by an electronic device, of performing an operation based on bending, the method including: sensing bending that deforms a shape of the electronic device; determining a first region, from which the bending is sensed, from among regions of the electronic device; selecting an object indicated by the first region from at least one object displayed on the electronic device; and performing an operation on the selected object.

13 Claims, 25 Drawing Sheets

(51) Int. Cl.
*G06F 3/04817* (2022.01)
*G06F 3/0482* (2013.01)
*G06F 3/147* (2006.01)
*H04M 1/02* (2006.01)

(52) U.S. Cl.
CPC .......... *G06F 3/04817* (2013.01); *G06F 3/147* (2013.01); *H04M 1/0268* (2013.01); *G06F 2203/04102* (2013.01)

(58) Field of Classification Search
CPC ......... G06F 2203/04102; G06F 1/1677; G06F 3/017; G06F 3/011; G06F 3/04842; G06F 3/0487; G06F 3/04883; G06F 3/01; G09G 2354/00; G09G 2380/02; H04M 1/0214; H04M 1/0268; H04M 1/0241
See application file for complete search history.

(56) References Cited

U.S. PATENT DOCUMENTS

| | | | |
|---|---|---|---|
| 7,215,945 | B2 | 5/2007 | Pappalardo et al. |
| 7,880,718 | B2 | 2/2011 | Cradick et al. |
| 8,988,381 | B1 | 3/2015 | Kim et al. |
| 9,268,368 | B2 | 2/2016 | Kang et al. |
| 9,318,070 | B2 | 4/2016 | Park et al. |
| 9,459,656 | B2 * | 10/2016 | Shai ............... G06F 1/169 |
| 9,778,766 | B2 | 10/2017 | Choi et al. |
| 9,886,187 | B2 | 2/2018 | Seo et al. |
| 9,952,706 | B2 | 8/2018 | Cho et al. |
| 10,403,241 | B2 | 9/2019 | Kim et al. |
| 10,425,521 | B2 | 9/2019 | Kim et al. |
| 2010/0056223 | A1 | 3/2010 | Choi et al. |
| 2012/0188153 | A1 | 7/2012 | Tziortzis et al. |
| 2014/0015743 | A1 * | 1/2014 | Seo .................. G09G 3/035 345/156 |
| 2014/0028596 | A1 | 1/2014 | Seo et al. |
| 2014/0210706 | A1 | 7/2014 | Park et al. |
| 2014/0320393 | A1 | 10/2014 | Modarres et al. |
| 2016/0026219 | A1 * | 1/2016 | Kim ................ G06F 1/1641 345/173 |
| 2016/0109973 | A1 * | 4/2016 | Kim ................ G06F 1/1652 345/173 |
| 2016/0246331 | A1 | 8/2016 | Cho |
| 2017/0018250 | A1 | 1/2017 | Shai |
| 2017/0221456 | A1 * | 8/2017 | Kim ................ G06F 1/1641 |
| 2019/0250760 | A1 | 8/2019 | Chang et al. |

FOREIGN PATENT DOCUMENTS

| | | |
|---|---|---|
| KR | 10-2009-0032420 A | 4/2009 |
| KR | 10-2013-0113900 A | 10/2013 |
| KR | 10-2013-0125652 A | 11/2013 |
| KR | 10-2014-0016075 A | 2/2014 |
| KR | 10-2014-0031679 A | 3/2014 |
| KR | 10-2014-0047941 A | 4/2014 |
| KR | 10-2017-0090851 A | 8/2017 |

OTHER PUBLICATIONS

Indian Office Action dated Oct. 27, 2020, issued in Indian Application No. 201841025756.
"It's 2016. Why Can't Anyone Make a Decent Freaking To-Do App?", Wired, https://www.wired.com/2016/03/best-to-do-list-app/ (Mar. 2016).
"To-do/tasks widget that shows the list", Android Forums at AndroidCentral, https://forums.androidcentral.com/samsung-galaxy-s4/290018-do-tasks-widget-shows-list.html (Oct. 2015).
Evernote, "Searching within a document on Android", https://discussion.evernote.com/topic/47657-searching-within-a-document-on-android/ (Nov. 2013).
"Google Takes on the Sticky Note Problem", https://blog.granted.com/2017/03/21/google-takes-on-the-sticky-note-problem/ (Mar. 2017).
Extended European Search Report dated Jul. 13, 2021, issued in European Patent Application No. 19834838.5-1216.
European Office Action dated Oct. 21, 2022, issued in European Patent Application No. 19834838.5-1224.

* cited by examiner

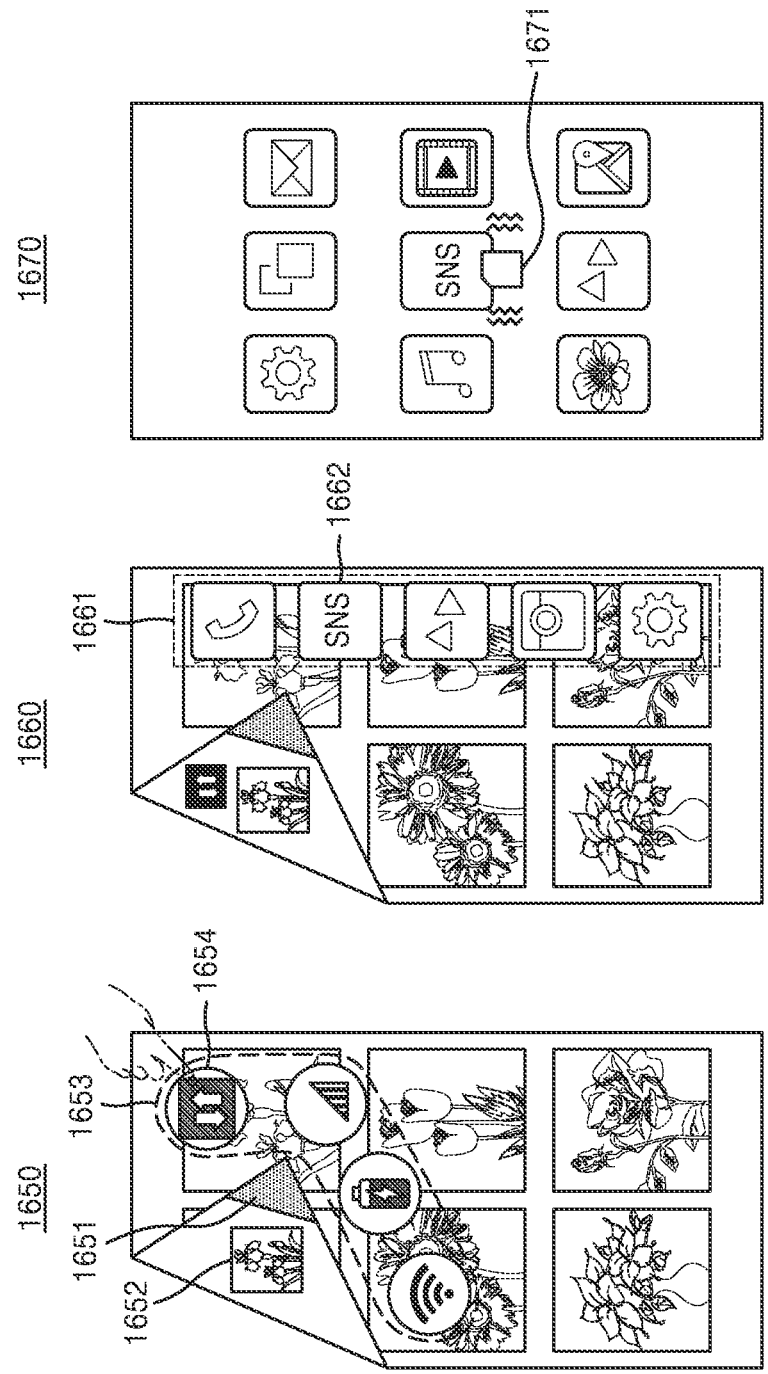

FIG. 17

| ICON | OPERATION CONDITION | USAGE EXAMPLE |
|---|---|---|
| 1701 | WI-FI CONNECTION | UPON CONNECTION TO WI-FI, UPLOAD CONTENT VIA APPLICATION |
| 1702 | REMAINING BATTERY POWER | WHEN REMAINING BATTERY POWER IS 15 %, DISPLAY CONTENT BY USING CAMERA APP |
| 1703 | DATA NETWORK CONNECTION | UPON CONNECTION TO DATA NETWORK, CALL NUMBER IN MEMO |
| 1704 | DATA LIMIT | WHEN DATA LIMIT IS RENEWED, DOWNLOAD CONTENT VIA URL IN MEMO |
| 1705 | STORAGE CAPACITY LIMIT | WHEN STORAGE CAPACITY IS INCREASED, DOWNLOAD CONTENT VIA URL IN MEMO |

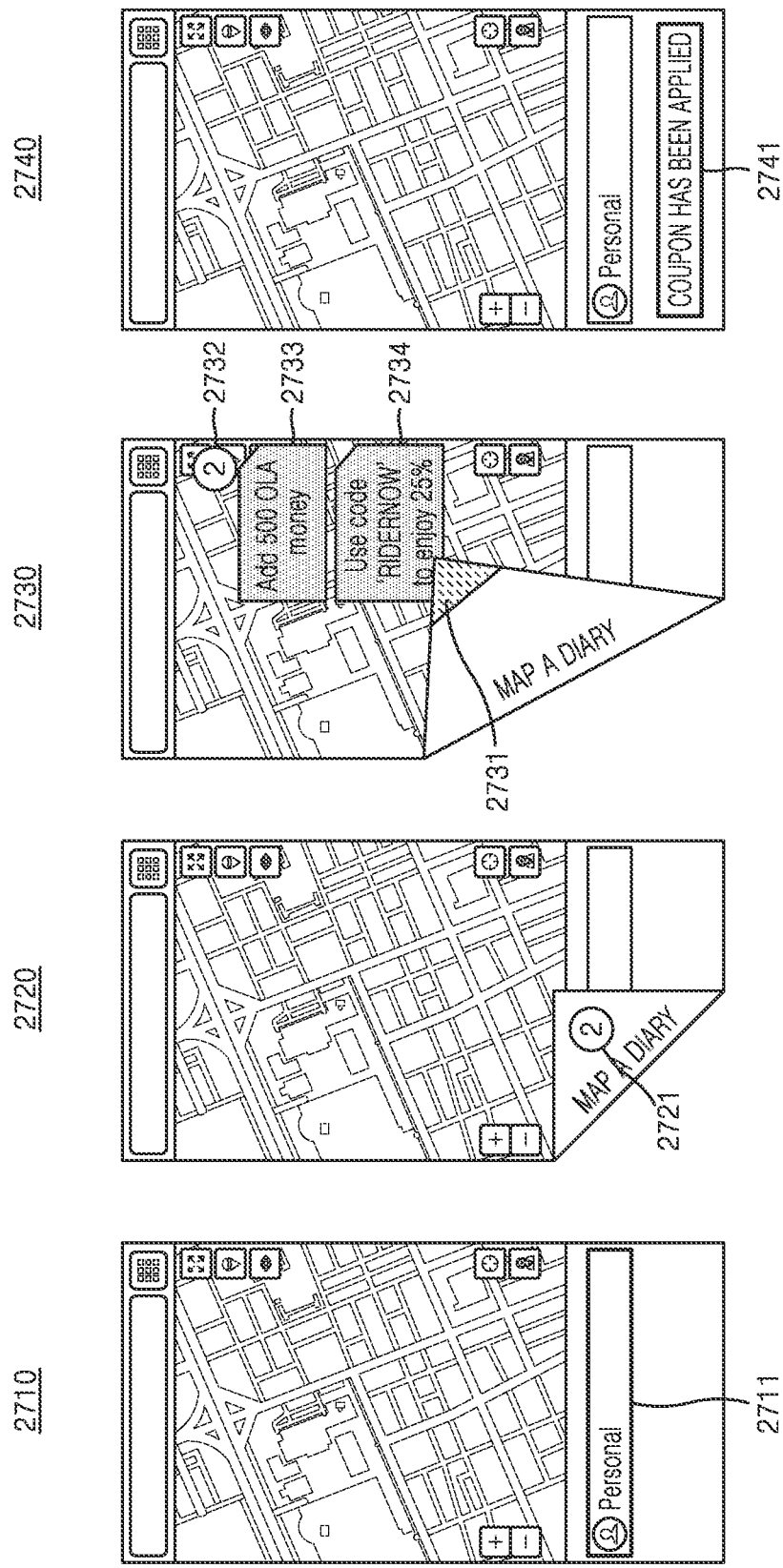

METHOD AND ELECTRONIC DEVICE FOR PERFORMING OPERATION ON BASIS OF BENDING

TECHNICAL FIELD

The present disclosure relates to an electronic device for performing an operation based on bending of the electronic device and a method of operating the electronic device.

BACKGROUND ART

Along with advancements in technology, various types of display devices have been developed. Among such display devices, flexible displays have flexibility unlike conventional display devices. According to such flexible displays, various input methods using bending as well as touch inputs may be used. For example, users may control operations of flexible display devices by bending portions thereof.

For users to control electronic devices by using bending, the users need to be acquainted with types of bending and operations corresponding thereto in advance, or a guide to bending inputs needs to be displayed on displays. However, when the users are unfamiliar with bending inputs or it is difficult to display the guide due to the small sizes of the displays, there is a difficulty in causing the electronic devices to perform operations through the bending inputs by the users.

Therefore, there is demand for a method of easily and intuitively performing various operations of an electronic device, based on bending, by using characteristics of the flexible displays.

DESCRIPTION OF EMBODIMENTS

Technical Solution to Problem

The present disclosure provides an electronic device for performing an operation based on bending of the electronic device and a method of operating the electronic device.

The present disclosure also provides a computer program product including a computer-readable recording medium having recorded thereon a program for executing the method set forth above on a computer. The present disclosure is not limited to the above aspects, and there may be other aspects of the present disclosure.

BRIEF DESCRIPTION OF DRAWINGS

FIG. 16 is a diagram illustrating an example of generating a memo, according to an embodiment of the present disclosure.

FIG. 17 is a diagram illustrating an example of an operation condition that may be set for an application, according to an embodiment of the present disclosure.

FIG. 27 is a diagram illustrating an example of retrieving a memo, according to an embodiment of the present disclosure.

MODE OF DISCLOSURE

Figure 1:
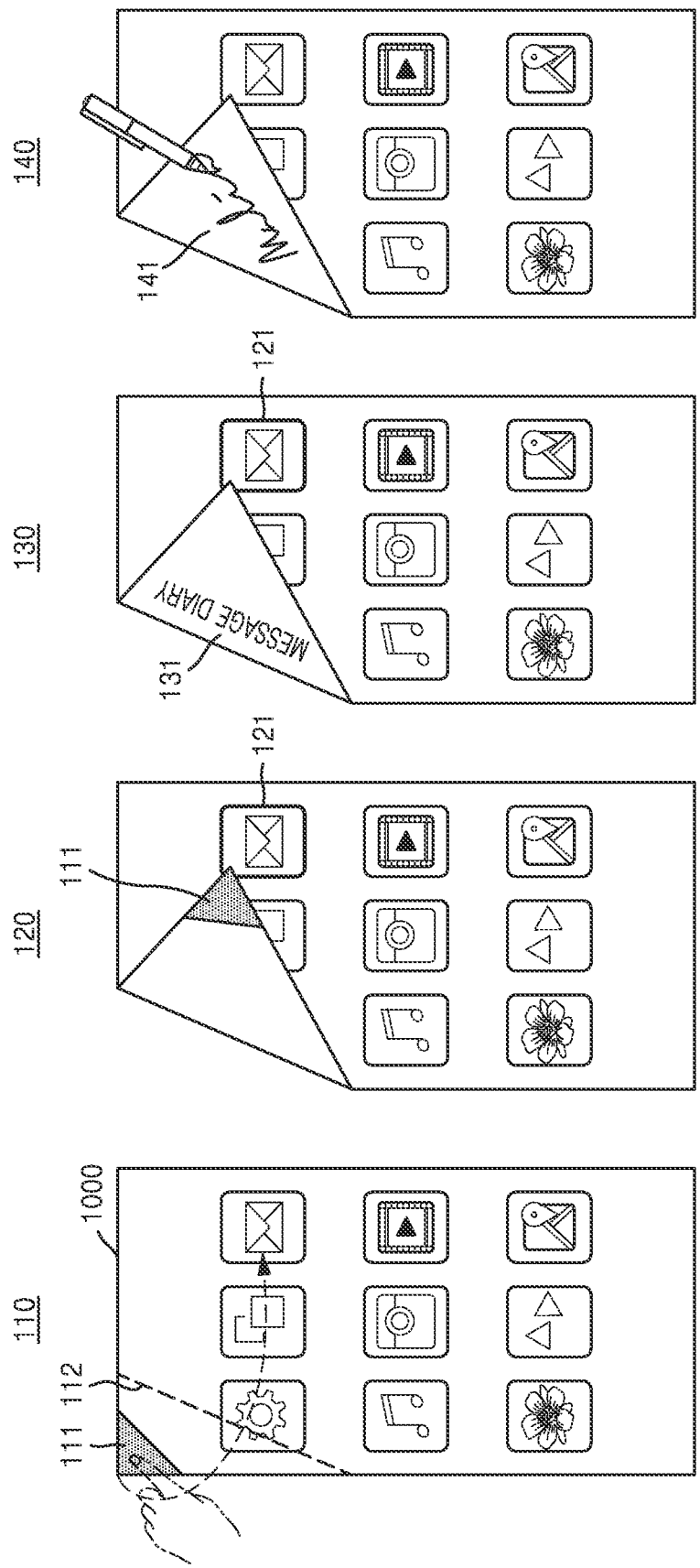
FIG. 1 is a diagram illustrating an example of performing an operation of generating a memo based on bending, according to an embodiment of the present disclosure.

According to a first aspect of the present disclosure, there is provided a method, performed by an electronic device, of performing an operation based on bending, the method including: sensing bending that deforms a shape of the electronic device; determining a first region, from which the bending is sensed, from among regions of the electronic device; selecting an object indicated by the first region from at least one object displayed on the electronic device; and performing an operation on the selected object.

According to a second aspect of the present disclosure, there is provided an electronic device for performing an operation based on bending, the electronic device including: a display; a memory storing one or more instructions; and at least one processor configured to execute the one or more instructions stored in the memory, wherein the at least one processor is configured to execute the one or more instructions to: sense bending that deforms a shape of the electronic device; determine a first region, from which the bending is sensed, from among regions of the electronic device; select an object indicated by the first region from at least one object displayed on the electronic device; and perform an operation on the selected object.

According to a third aspect of the present disclosure, there is provided a computer program product that includes a recording medium having stored therein a program for performing the method according to the first aspect of the present disclosure.

Hereinafter, embodiments of the present disclosure will be described in detail with reference to the accompanying drawings such that one of ordinary skill in the art may readily make implementations thereof. However, it should be understood that the present disclosure may be embodied in different ways and is not limited to embodiments described herein. In addition, portions irrelevant to the description are omitted from the drawings for clarity, and like components are denoted by like reference numerals throughout the specification.

Throughout the specification, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

Hereinafter, the present disclosure will be described in detail with reference to the accompanying drawings.

FIG. 1 is a diagram illustrating an example of performing an operation of generating a memo based on bending, according to an embodiment of the present disclosure.

Referring to FIG. 1, an electronic device 1000 may sense an input of bending a region 111 of the electronic device 1000. As the input of bending the region 111 of the electronic device 1000 is sensed, the electronic device 1000 may perform an operation corresponding to the sensed bending input.

The electronic device 1000 according to an embodiment of the present disclosure may be implemented in various forms by a device including a flexible display allowing the region 111 of the electronic device 1000 to be bent. For example, the electronic device 1000 described herein may include, but is not limited to, a digital camera, a smart phone, a laptop computer, a tablet personal computer (PC), an electronic book (e-book) terminal, a digital broadcasting terminal, a personal digital assistant (PDA), a portable multimedia player (PMP), a navigation system, or the like.

The electronic device 1000 described herein may include a wearable device that may be worn by a user. The wearable device may include, but is not limited to, at least one of an accessory type device (for example, a watch, a ring, a wristband, an ankle band, a necklace, glasses, or contact lenses), a head-mounted device (HMD), a fabric or clothing-integrated device (for example, electronic clothes), a body-attached device (for example, a skin pad), or a bio-implantable device (for example, an implantable circuit). Hereinafter, for convenience of description, descriptions will be made by taking an example in which the electronic device 1000 is a smart phone.

According to an embodiment of the present disclosure, the electronic device 1000 may sense bending that deforms a shape of the electronic device 1000, and may determine the region 111 of the electronic device 1000, from which the bending is sensed. In addition, the electronic device 1000 may perform an operation on an object indicated by the determined region 111.

According to an embodiment of the present disclosure, the object indicated by the determined region 111 may be one of at least one object displayed on the electronic device 1000.

According to an embodiment of the present disclosure, at least one region 111 that is bendable may be a portion of a display area of the electronic device 1000. According to an embodiment of the present disclosure, when the bending is sensed, a bending-sensed portion of an area of the electronic device 1000 may be determined to be a first region from which the bending is sensed.

Referring to 110 of FIG. 1, the first region 111 of the electronic device 1000 may be bent by folding or bending the first region 111 about a marked line 112. The marked line 112 is merely an example, and the first region 111 of the electronic device 1000 may be folded or bent about another line.

The first region 111 according to an embodiment of the present disclosure is a portion of a flexible display of the electronic device 1000 and may be foldable or bendable like paper. According to an embodiment of the present disclosure, only the first region 111 may be configured by a flexible display, or the entire display screen of the electronic device 1000 may be configured by a flexible display.

As shown in 110 of FIG. 1, the first region 111 may be marked to represent that the first region 111 is a certain region of the electronic device 1000, on which the bending according to an embodiment of the present disclosure may be performed, while the electronic device 1000 is not bent. For example, the first region 111 may be marked by a yellow color to be distinguished from other regions of the display. The present disclosure is not limited to the illustrated example, and the first region 111 may be marked in various manners to be distinguished from the other regions of the display.

According to an embodiment of the present disclosure, the electronic device 1000 may include a plurality of first regions that are bendable, and an operation corresponding to each first region may be predetermined. For example, an operation of generating a memo may be determined for the first region on the upper left side, and an operation of retrieving a memo may be determined for the first regions on the upper right, lower left, and lower right sides. Accordingly, according to an embodiment of the present disclosure, when a certain region of the electronic device 1000 is bent, an operation corresponding to the bent region, out of the operation of generating a memo and the operation of retrieving a memo, may be performed on an object selected by the bent region.

According to an embodiment of the present disclosure, when the electronic device 1000 senses bending, the electronic device 1000 may determine an operation corresponding to the first region 111, from which the bending is sensed, from among the operations predetermined for the respective regions and may perform the determined operation on the object selected by the first region 111.

120 of FIG. 1 illustrates that the first region 111 is bent. The electronic device 1000 may identify an object 121 that is displayed on the electronic device 1000 and indicated by the bent first region 111. According to an embodiment of the present disclosure, the electronic device 1000 may perform various operations on the identified object 121.

The object 121 indicated by the first region 111 bent according to an embodiment of the present disclosure may be determined according to a position of the bent first region 111. For example, the object 121 displayed at a position, which is touched by the bent first region 111, on the display of the electronic device 1000 may be determined to be the object 121 indicated by the first region 111 bent according to an embodiment of the present disclosure. As another example, the object 121 displayed at a position, which vertically corresponds to the bent first region 111, on the display may be determined to be the object 121 indicated by the first region 111 bent according to an embodiment of the present disclosure.

The present disclosure is not limited to the examples set forth above, and the object 121 indicated by the bent first region 111 may be determined by various methods capable of determining an object pointed to by the bent first region 111.

According to an embodiment of the present disclosure, a particular operation to be performed by the electronic device 1000 may be determined according to characteristics of an object determined to be the object 121 indicated by the bent first region 111.

For example, when the object 121 is an application icon corresponding to a particular application, the electronic device 1000 may perform an operation related to the application represented by the object 121. For example, the operation related to the application represented by the object 121 may include an operation of generating or retrieving a memo regarding the application represented by the object 121.

In addition, when the object 121 is content such as a text, an image, a video, a user interface (UI) component, or a file, the electronic device 1000 may perform an operation related to a memo including the content corresponding to the object 121. For example, the operation related to the memo including the content corresponding to the object 121 may include an operation of generating or retrieving the memo including the content corresponding to the object 121.

For example, the electronic device 1000 may generate a memo including matters related to content indicated by the bent first region 111. The matters related to the content may include, for example, various matters related to the content, such as a content file itself, identification information representing the content, or a uniform resource locator (URL) address from which the content is capable of being downloaded.

As another example, the electronic device 1000 may extract at least one feature from the content indicated by the bent first region 111 and may retrieve a memo that includes content having the extracted feature.

The present disclosure is not limited to the examples set forth above, and the electronic device 1000 may generate or retrieve the memo related to the content according to various methods.

Each of 130 and 140 of FIG. 1 illustrates an example in which the electronic device 1000 generates a memo regarding the object 121, as an operation on the object 121 indicated by the bent first region 111.

According to an embodiment of the present disclosure, as the object 121 is an application icon, the electronic device 1000 may display (131), on the display, the generation of a memo related to an application corresponding to the object 121.

For example, when the electronic device 1000 has generated the memo related to the application, the electronic device 1000 may add the generated memo to an "app diary". The "app diary" according to an embodiment of the present disclosure may store therein a memo regarding each application. For example, a memo regarding a first application may be stored in a "first application diary", and a memo regarding a second application may be stored in a "second application diary".

As shown in 130 of FIG. 1, the electronic device 1000 may display a "message diary" 131 representing the generation of a memo that is to be added to an app diary of a message application corresponding to the object 121.

According to an embodiment of the present disclosure, although the "message diary" 131, as shown in FIG. 1, may be displayed in a display area on the backside of the bent region, the present disclosure is not limited thereto, and the "message diary" 131 may be displayed in various regions of the display area of the electronic device 1000.

While the "message diary" 131 is displayed, memo contents input to the electronic device 1000 may be stored as a memo of the "message diary" 131.

In 140 of FIG. 1, a memo 141 to be added to the "message diary" 131 may be input by a user. Although the memo 141, as shown in 140 of FIG. 1, may be input by a pen touch input by the user, the present disclosure is not limited thereto, and the memo 141 may be input by various input methods such as a speech input, a keyboard input, or a touch input.

The memo 141 input according to an embodiment of the present disclosure may be added to the "message diary" 131 and thus stored, in the electronic device 1000, as the memo 141 related to the message application corresponding to the object 121.

Accordingly, the user according to an embodiment of the present disclosure may easily generate a memo regarding the object 121 by simply using a bending operation causing the first region 111 of the electronic device 1000 to indicate the object 121 for generating a memo, even without separately executing a memo application for generating a memo.

Figure 2:
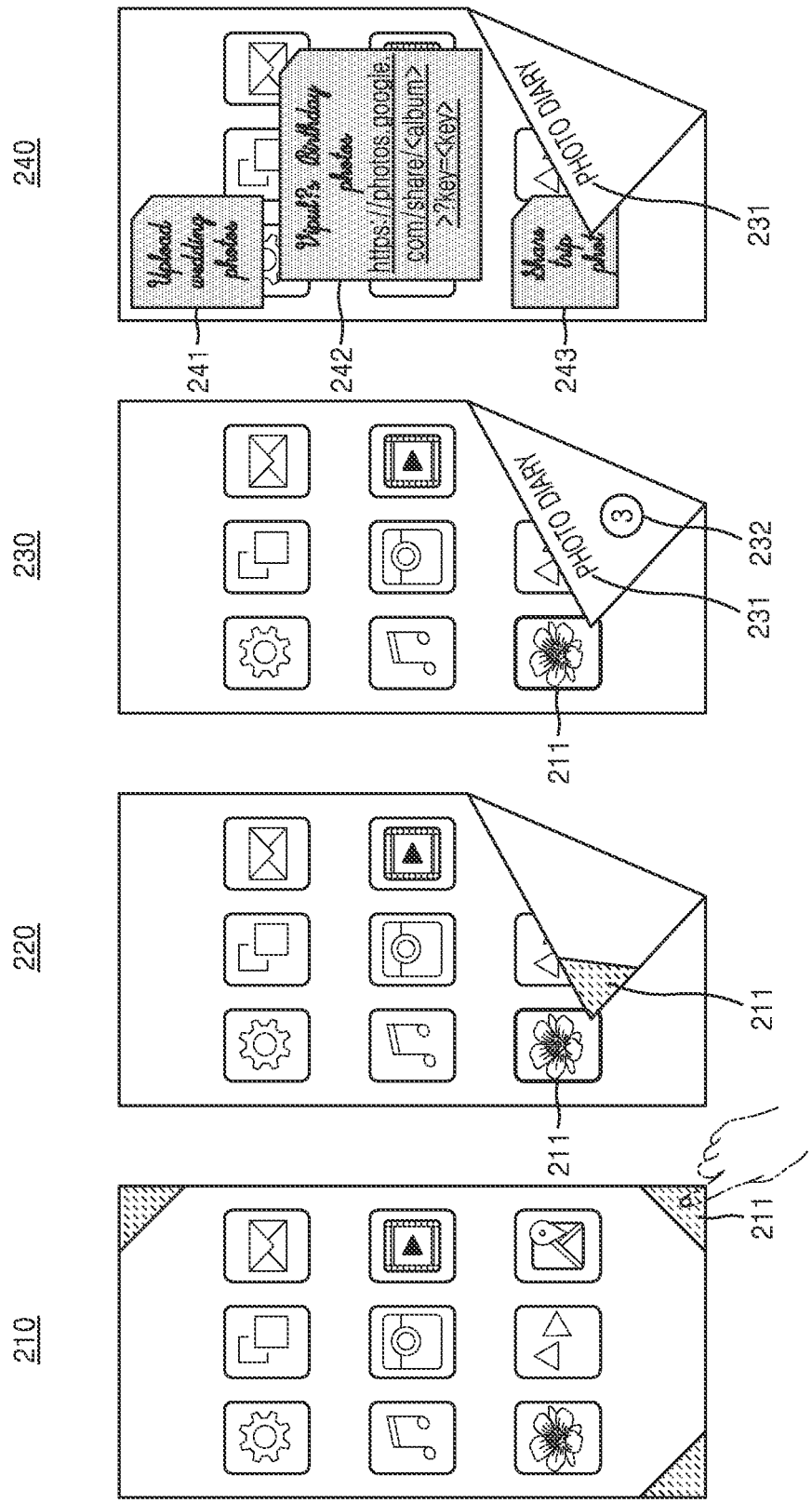
FIG. 2 is a diagram illustrating an example of performing an operation of retrieving a memo based on bending, according to an embodiment of the present disclosure.

FIG. 2 is a diagram illustrating an example of performing an operation of retrieving a memo based on bending, according to an example of the present disclosure.

Referring to FIG. 2, the electronic device 1000 may perform an operation of displaying a memo stored in the electronic device 1000, based on sensed bending.

Referring 210 of FIG. 2, a first region 211 on one side of the electronic device 1000 may be bent.

The first region 211 may include a mark representing a region of the electronic device 1000, on which bending according to an embodiment of the present disclosure may be performed, as shown in 210 of FIG. 2. For example, the first region 211 may be marked by a green color to be distinguished from other regions of the display. The present disclosure is not limited to the illustrated example, and the first region 211 may be marked in various manners to be distinguished from the other regions of the display.

According to an embodiment of the present disclosure, the first region 111 illustrated on the upper left side in 110 of FIG. 1 may correspond to an operation of generating a memo. In addition, respective first regions on the upper right, lower left, and lower right sides except for the first region 111 on the upper left side, as shown in 210 of FIG. 2, may correspond to an operation of retrieving and displaying a memo. The present disclosure is not limited to the illustrated example, and at least one first region according to an embodiment of the present disclosure may correspond to various operations.

220 of FIG. 2 illustrates that the first region 211 is bent. The electronic device 1000 may identify an object 221 that is displayed on the electronic device 1000 and indicated by the bent first region 211. According to an embodiment of the present disclosure, the electronic device 1000 may perform various operations on the identified object 221.

The object 221 indicated by the first region 211 bent according to an embodiment of the present disclosure may be determined according to a position of the bent first region 211. As in FIG. 1, the object 221 indicated by the bent first region 211 may be determined based on a position on the display, which is touched by the bent first region 211, a position on the display, which vertically corresponds to the bent first region 211, or the like.

According to an embodiment of the present disclosure, as in FIG. 1, an operation to be performed by the electronic device 1000 may be determined according to characteristics of an object that is determined to be the object 221 indicated by the bent first region 211.

Each of 230 and 240 of FIG. 2 illustrates an example in which the electronic device 1000 retrieves a memo regarding the object 221 and displays the retrieved memo, as an operation on the object 221 indicated by the bent first region 211.

According to an embodiment of the present disclosure, as the object 221 is an application icon, the electronic device 1000 may display (231), on the display, the retrieval of a memo related to an application corresponding to the object 221.

Referring to 230 of FIG. 2, the electronic device 1000 may display a "photo diary" 231, which is an app diary for storing a memo corresponding to the object 221. In addition, a number representing the number of memos stored in the "photo diary" 231, in addition to the "photo diary" 231, may also be displayed.

Referring to 240 of FIG. 2, the electronic device 1000 may display memos 241, 242, and 243 stored in the "photo diary" 231. According to an embodiment of the present disclosure, although the memos 241, 242, and 243 may be displayed as in 240 of FIG. 2 according to a user input, the present disclosure is not limited thereto, and the memos 241, 242, and 243 may also be displayed according to the satisfaction of preset conditions.

Accordingly, a user according to an embodiment of the present disclosure may easily retrieve a memo regarding the object 221 by simply using a bending operation causing the first region 211 of the electronic device 1000 to indicate the object 221 related to the memo intended to be retrieved, even without separately executing a memo application for retrieving a memo.

Figure 3:
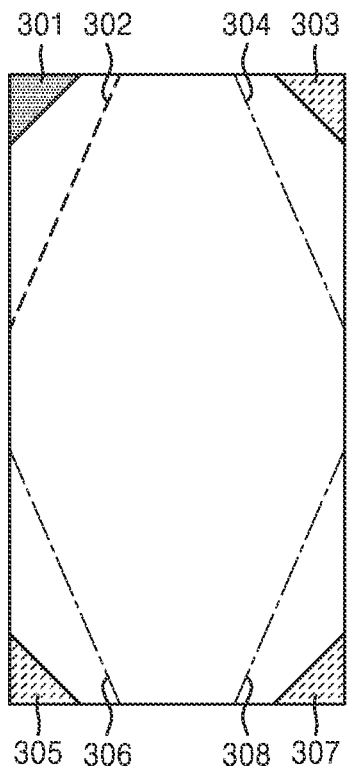
FIG. 3 is a diagram illustrating an example of a display of an electronic device, according to an embodiment of the present disclosure.

FIG. 3 is a diagram illustrating an example of a display of the electronic device 1000, according to an embodiment of the present disclosure.

Referring to FIG. 3, the display of the electronic device 1000, according to an embodiment of the present disclosure, may be a flexible display capable of being bent.

According to an embodiment of the present disclosure, the display of the electronic device 1000 may include four regions 301, 303, 305, and 307 capable of being bent. According to an embodiment of the present disclosure, the regions 301, 303, 305, and 307 may be folded or bent about marked lines 302, 304, 306, and 308, respectively, whereby the electronic device 1000 may sense the bending thereof.

According to an embodiment of the present disclosure, an operation performed due to the bending of each of the regions 301, 303, 305, and 307 may be different according to a position of each of the regions 301, 303, 305, and 307. For example, when the region 301 on the upper left side is bent, an operation of generating a memo related to an object indicated by the bent region 301 may be performed. In addition, when at least one of the remaining regions 303, 305, and 307 except for the region 301 on the upper left side is bent, an operation of retrieving and displaying a memo related to an object indicated by each of the regions 303, 305, and 307 may be performed.

Figure 4:
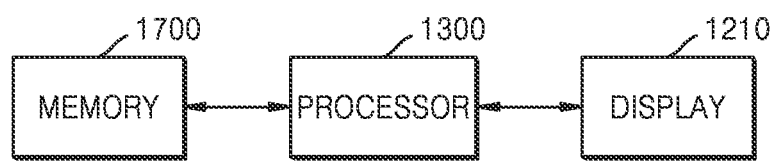
FIG. 4 is a block diagram illustrating an internal configuration of an electronic device, according to an embodiment of the present disclosure.

FIG. 4 is a block diagram illustrating an internal configuration of the electronic device 1000, according to an embodiment of the present disclosure.

Figure 5:
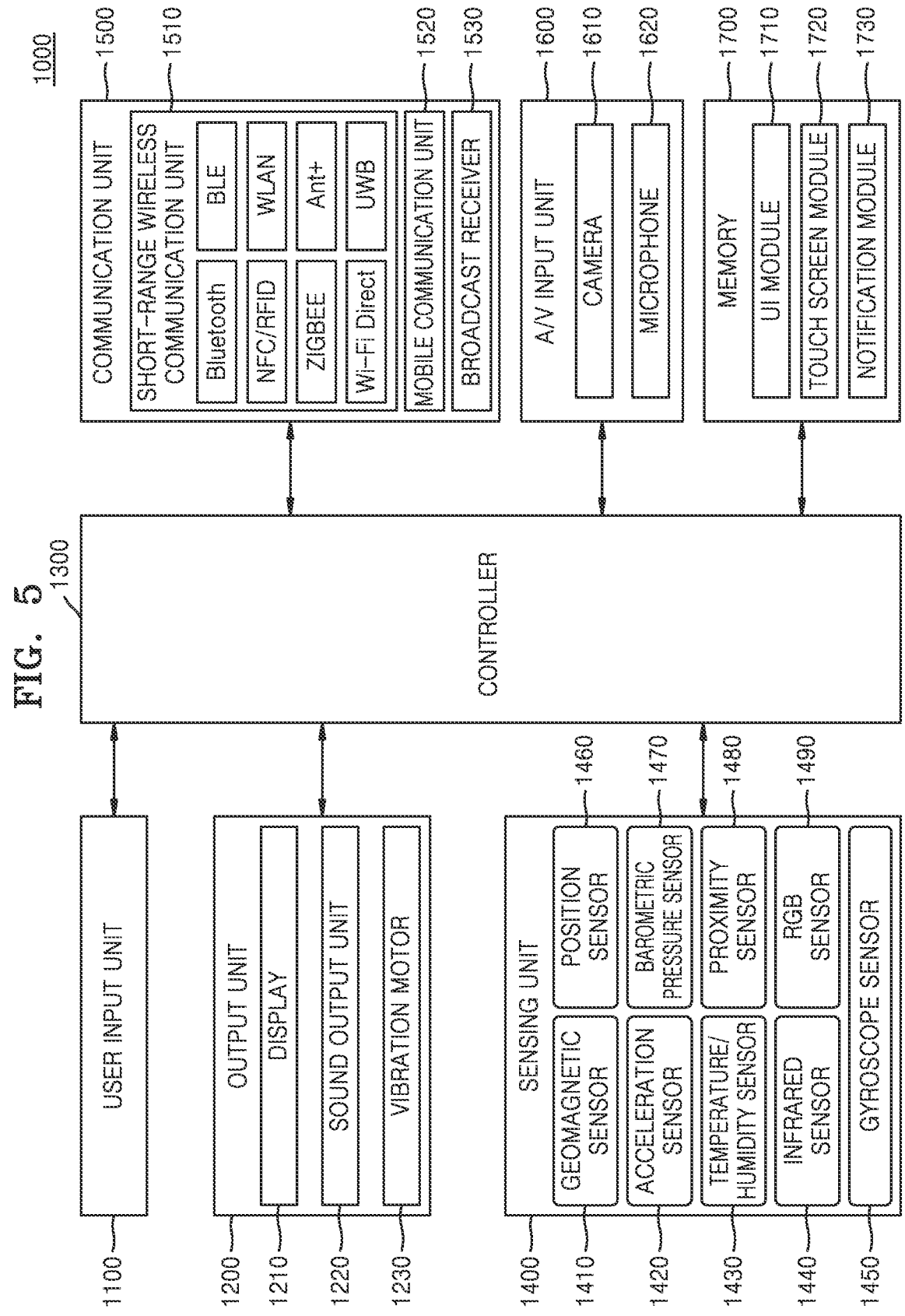
FIG. 5 is a block diagram illustrating an internal configuration of an electronic device, according to an embodiment of the present disclosure.

FIG. 5 is a block diagram illustrating an internal configuration of the electronic device 1000, according to an embodiment of the present disclosure.

Referring to FIG. 4, the electronic device 1000 may include a memory 1700, a processor 1300, and a display 1210. However, not all the components illustrated in FIG. 4 are not necessary components of the electronic device 1000. The electronic device 1000 may be implemented by more components or less components than the components illustrated in FIG. 4.

For example, as shown in FIG. 5, the electronic device 1000 according to an embodiment of the present disclosure may further include a user input unit 1100, a sensing unit 1400, an output unit 1200, a communication unit 1500, and an audio/video (A/V) input unit 1600 in addition to the memory 1700, the processor 1300, and the display 1210.

The user input unit 1100 refers to a means for inputting data for a user to control the electronic device 1000. For example, the user input unit 1100 may include, but is not limited to, a keypad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

According to an embodiment of the present disclosure, the user input unit 1100 may receive a user input for generating or retrieving a memo.

The output unit 1200 may output an audio signal, a video signal, or a vibration signal, and the output unit 1200 may include the display 1210, a sound output unit 1220, and a vibration motor 1230.

The output unit 1200 according to an embodiment of the present disclosure may output a result of performing an operation according to an input by a user. For example, the output unit 1200 may output a result of generating or retrieving a memo.

The display 1210 displays and outputs information processed by the electronic device 1000.

When the display 1210 and a touch pad form a layer structure and thus constitute a touch screen, the display 1210 may also be used as an input device in addition to being used as an output device. The display 1210 may include at least one of a liquid crystal display, a thin film transistor-liquid crystal display, an organic light-emitting diode, a flexible display, a three-dimensional (3D) display, or an electrophoretic display. The electronic device 1000 may include two or more displays 1210 according to an implementation type of the electronic device 1000.

The display 1210 according to an embodiment of the present disclosure may include a flexible display capable of being bent by the user. When it is sensed that a region on one side of the flexible display is bent by the user, an operation may be performed on an object indicated by the bent region of the electronic device 1000.

The sound output unit 1220 outputs audio data received from the communication unit 1500 or stored in the memory 1700. The sound output unit 1220 according to an embodiment of the present disclosure may output audio data representing a result of performing an operation according to a bending input by the user.

The vibration motor 1230 may output a vibration signal. In addition, when a touch is input to a touch screen, the vibration motor 1230 may output a vibration signal. The vibration motor 1230 according to an embodiment of the present disclosure may output a vibration signal representing a result of performing an operation according to a bending input by the user.

The processor 1300 generally controls overall operations of the electronic device 1000. For example, the processor 1300 may take overall control of the user input unit 110, the output unit 1200, the sensing unit 1400, the communication unit 1500, the A/V input unit 1600, and the like by executing programs stored in the memory 1700. The electronic device 1000 may include at least one processor 1300.

The processor 1300 may be configured to process instructions of a computer program by performing basic arithmetic, logic, and input/output operations. The instructions may be provided from the memory 1700 to the processor 1300 or may be received via the communication unit 1500 and provided to the processor 1300. For example, the processor 1300 may be configured to execute the instructions according to program codes stored in a recording device such as memory.

When bending of a certain region of the electronic device 1000 is sensed, the at least one processor 1300 according to an embodiment of the present disclosure may determine a first region, from which the bending is sensed, from among regions of the electronic device 1000. The at least one processor 1300 according to an embodiment of the present disclosure may determine an object indicated by the first region and may perform, on the object, an operation corresponding to the first region. The object may be an object displayed on the electronic device 1000.

According to an embodiment of the present disclosure, the operation corresponding to the first region, from which the bending is sensed, may be determined, and the determined operation may be performed on the object indicated by the first region. Accordingly, a different operation may be performed according to a position of the bending-sensed region on the electronic device 1000.

For example, when the object indicated by the bent region is content, the at least one processor 1300 may perform an operation of generating or retrieving a memo related to the content.

In addition, when the object indicated by the bent region is an application icon, the at least one processor 1300 may perform an operation of generating or retrieving a memo related to an application corresponding to the application icon.

Further, the at least one processor 1300 may determine an application related to the object indicated by the bent region and, based on the determined application, may perform an operation on the object. For example, the at least one processor 1300 may set, by the determined application, an operation to be performed on the object, and an operation condition for the operation. After the operation condition is set, when the set operation condition is satisfied, the set operation may be performed on the object by the determined application.

The sensing unit 1400 may sense a state of the electronic device 1000 or a state around the electronic device 1000 and may transfer sensed information to the processor 1300.

The sensing unit 1400 may include, but is not limited to, at least one of a geomagnetic sensor 1410, an acceleration sensor 1420, a temperature/humidity sensor 1430, an infrared sensor 1440, a gyroscope sensor 1450, a position sensor (for example, a global positioning system (GPS)) 1460, a barometric pressure sensor 1470, a proximity sensor 1480, or an RGB sensor (illuminance sensor) 1490.

According to an embodiment of the present disclosure, the information sensed by the sensing unit 1400 may be used to generate or retrieve a memo. For example, when bending, which deforms the shape of the electronic device 1000, is sensed by the sensing unit 1400, an object indicated by a bending-sensed region of the electronic device 1000 may be identified, and a memo may be generated or retrieved based on the identified object.

The communication unit 1500 may include one or more components allowing the electronic device 1000 to communicate with a server (not shown) or an external device (not shown). For example, the communication unit 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication unit, a wireless local area network (WLAN) (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 1520 transmits a radio signal to and receives a radio signal from at least one of a base station, an external terminal, or a server on a mobile communication network. Here, the radio signal may include various types of data according to transmission and reception of a voice call signal, a video call signal, or a text/multimedia message.

The broadcast receiver 1530 receives a broadcast signal and/or broadcast-related information from outside the electronic device 1000 via a broadcast channel. The broadcast channel may include a satellite channel or a terrestrial channel. The electronic device 1000 may not include the broadcast receiver 1530, according to an implementation example.

The communication unit 1500 according to an embodiment of the present disclosure may transmit, to an external device (not shown), information about a memo generated or retrieved by the electronic device 1000. For example, to share contents of the memo with other users, the communication unit 1500 may transmit the information about the memo generated or retrieved by the electronic device 1000 to an external device (not shown), according to a user input.

The A/V input unit 1600 is for inputting an audio signal or a video signal and may include a camera 1610, a microphone 1620, and the like. The camera 1610 may obtain an image frame of a still image, a moving image, or the like through an image sensor in a video call mode or a shooting mode. An image captured through the image sensor may be processed by the processor 1300 or a separate image processing unit (not shown). The microphone 1620 receives an external sound signal that is input thereto and processes the sound signal into electrical sound data.

According to an embodiment of the present disclosure, a moving image, an image, speech data, or the like generated by the A/V input unit 1600 may be included in a newly generated memo or be used to retrieve a memo.

The memory 1700 may store programs for processing and control performed by the processor 1300 and may also store data that is input to or output from the electronic device 1000.

The memory 1700 according to an embodiment of the present disclosure may store one or more instructions, and the at least one processor 1300 of the electronic device 1000 may perform an operation according to an embodiment of the present disclosure by executing the one or more instructions stored in the memory 1700.

In addition, the memory 1700 according to an embodiment of the present disclosure may store data required to perform an operation corresponding to an object indicated by a bent region of the electronic device 1000. For example, the memory 1700 may store data of a memo related to the object indicated by the bent region.

Further, the memory 1700 according to an embodiment of the present disclosure may store at least one memo generated by the electronic device 1000. A memo according to an embodiment of the present disclosure may be stored in an app diary corresponding to an application related to the memo. For example, at least one memo related to the application corresponding to the app diary may be stored in the app diary. Accordingly, the memory 1700 according to an embodiment of the present disclosure may store at least one app diary in which at least one memo is stored.

The memory 1700 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

The programs stored in the memory 1700 may be classified into a plurality of modules, for example, a UI module 1710, a touch screen module 1720, a notification module 1730, and the like, according to functions thereof.

The UI module 1710 may provide a specialized UI, a graphic user interface (GUI), or the like interworking with the electronic device 1000, on an application basis. The touch screen module 1720 may sense a touch gesture of the user on a touch screen and may transfer information about the touch gesture to the processor 1300. The touch screen module 1720 according to an embodiment of the present disclosure may recognize and analyze a touch code. The touch screen module 1720 may be configured by separate hardware including a controller.

To sense a touch or a proximity touch with respect to the touch screen, various sensors may be arranged inside or near the touch screen. An example of a sensor for sensing a touch with respect to the touch screen includes a tactile sensor. The tactile sensor refers to a sensor sensing a contact with a particular object to an extent felt by a human or to a higher extent. The tactile sensor may sense various pieces of information, such as roughness of a contact surface, hardness of a contact object, and a temperature of a contact point.

The touch gesture of the user may include tap, touch and hold, double tap, drag, panning, flick, drag and drop, swipe, or the like.

The notification module 1730 may generate a signal for notifying the occurrence of an event of the electronic device 1000.

Figure 6:
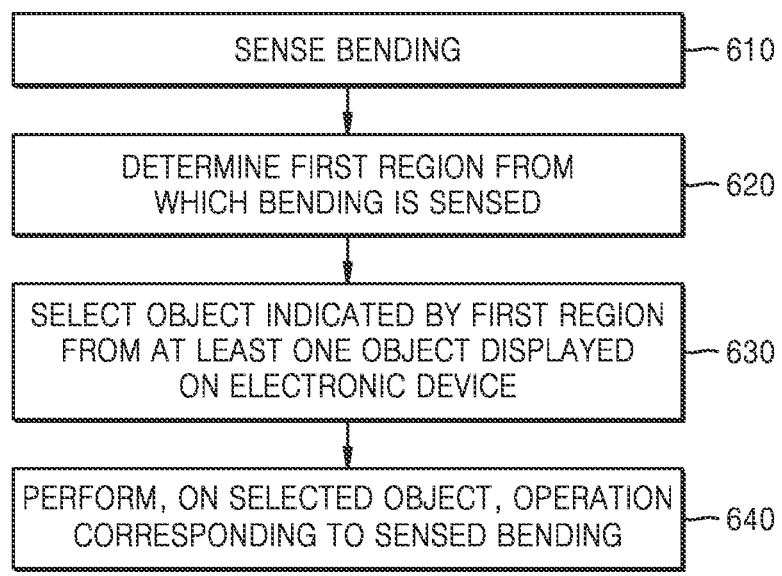
FIG. 6 is a flowchart illustrating a method of performing an operation based on bending according to an embodiment of the present disclosure.

FIG. 6 is a flowchart illustrating a method of performing an operation based on bending, according to an embodiment of the present disclosure.

Referring to FIG. 6, in operation 610, the electronic device 1000 may sense bending that deforms the shape of the electronic device 1000. According to an embodiment of the present disclosure, the electronic device 1000 may include a flexible display and may sense bending of a certain region of the flexible display.

According to an embodiment of the present disclosure, when the electronic device 1000 senses the bending, the electronic device 1000 may determine the bending-sensed region and may determine an operation corresponding to the determined region. For example, when an upper-left region is bent, an operation of generating a memo may be performed, and when upper-right, lower-left, and lower-right regions are bent, an operation of retrieving a memo may be performed.

In operation 620, the electronic device 1000 may determine a first region, from which the bending is sensed in operation 610, from among regions of the electronic device 1000. According to an embodiment of the present disclosure, a bending-sensed portion of a display area of the electronic device 1000 may be determined to be the first region. The present disclosure is not limited to the examples set forth above, and various regions other than the display area, in the electronic device 1000, may be determined to be the first region from which the bending is sensed.

In operation 630, the electronic device 1000 may select an object indicated by the first region. The object indicated by the bent first region may be one of at least one object displayed on the display of the electronic device 1000.

In operation 640, the electronic device 1000 may perform an operation on the selected object. According to an embodiment of the present disclosure, an operation of generating or retrieving a memo related to the selected object may be performed.

According to an embodiment of the present disclosure, an operation determined in correspondence with the bent first region of the electronic device 1000 may be performed on the object selected in operation 630.

For example, when the first region bent in operation 610 corresponds to an operation of generating a memo, an operation of generating a memo related to the selected object may be performed.

In addition, when the first region bent in operation 610 corresponds to an operation of retrieving a memo, an operation of retrieving a memo related to the selected object may be performed.

Accordingly, according to an embodiment of the present disclosure, by a bending operation that deforms the shape of the electronic device 1000, the electronic device 1000 may generate a memo from information related to the object displayed on the display thereof or may use the information to retrieve a memo, with no need to execute a particular application for storing the information about the object displayed on the electronic device 1000.

Figure 7:
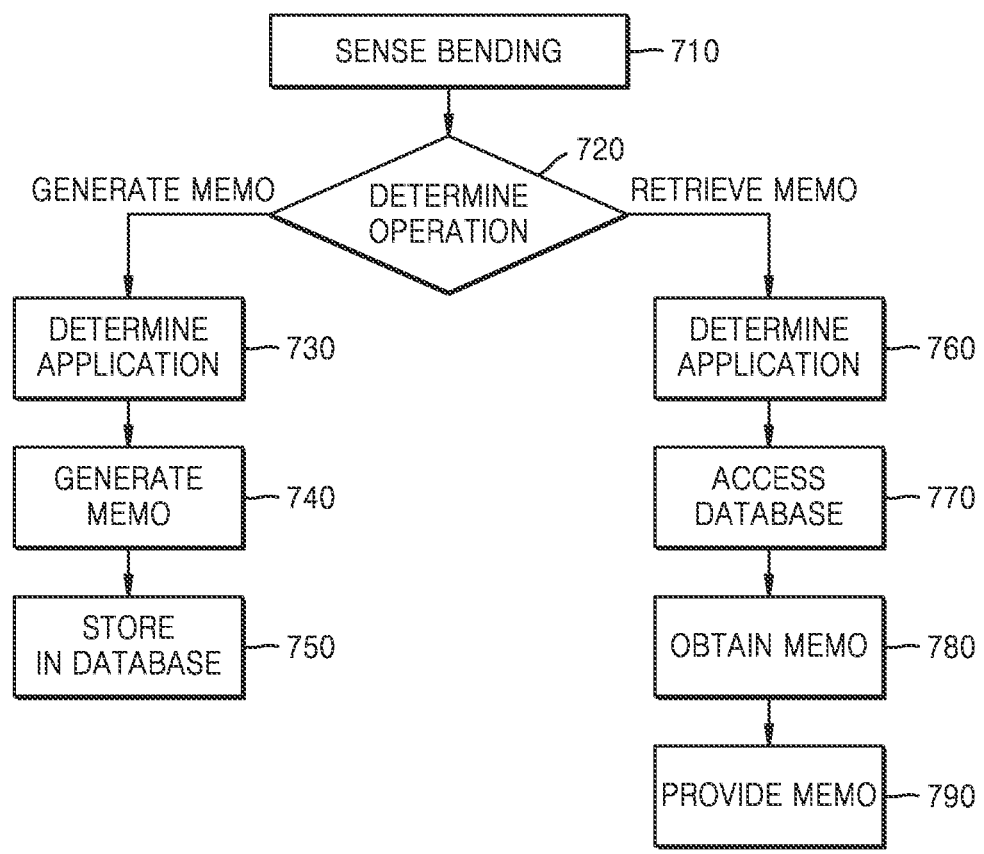
FIG. 7 is a flowchart illustrating a method of performing an operation of generating or retrieving a memo based on bending, according to an embodiment of the present disclosure.

FIG. 7 is a flowchart illustrating a method of performing an operation of generating or retrieving a memo based on bending, according to an embodiment of the present disclosure.

Referring to FIG. 7, in operation 710, the electronic device 1000 may sense bending that deforms the shape of the electronic device 1000.

In operation 720, the electronic device 1000 may determine an operation corresponding to a bending-sensed region, out of an operation of generating a memo and an operation of retrieving a memo. According to an embodiment of the present disclosure, when bending, which deforms the shape of the electronic device 1000, is sensed, a bending-sensed region of the electronic device 1000 may be determined. In addition, an operation to be performed due to the sensing of the bending may be determined according to a position of the determined region. For example, when an upper-left region of the electronic device 1000 is bent, an operation of generating a memo may be determined to be the operation corresponding to the bent region, and when another region except for the upper-left region of the electronic device 1000 is bent, an operation of retrieving a memo may be determined to be the operation corresponding to the bent region.

When, in operation 720, the operation of generating a memo is determined to be the operation corresponding to the bent region, an application related to an object indicated by the bent region may be determined in operation 730.

According to an embodiment of the present disclosure, the application related to the object may be determined to be one of an application currently running on the electronic device 1000, an application selected according to a user input from among a plurality of applications, and an application represented by an application icon corresponding to the object.

For example, when content displayed by the application currently running on the electronic device 1000 is determined to be the object indicated by the bent region, the application that is running may be determined to be the application related to the object in operation 730.

In addition, in operation 730, an operation of determining the application related to the object may be additionally performed. For example, the application selected according to the user input from among the plurality of applications may be determined to be the application related to the object. For example, an application list including the plurality of applications may be displayed on the electronic device 1000, and the application related to the object may be selected from the application list according to the user input. Alternatively, an application corresponding to an application name input by the user may be determined to be the application related to the object.

In addition, according to an embodiment of the present disclosure, when the object indicated by the bending-sensed region of the electronic device 1000 in operation 710 is an application icon, an application represented by the application icon may be determined to be the application related to the object in operation 730.

The present disclosure is not limited to the examples set forth above, and in operation 730, an application related to a memo may be determined by various methods.

In operation 740, the electronic device 1000 may generate a memo according to an input by the user, and in operation 750, the electronic device 1000 may add the generated memo to an app diary regarding the application determined in operation 730 from among app diaries stored in a database.

The memo generated in operation 740 according to an embodiment of the present disclosure may be generated based on the object indicated by the bent region. For example, when the object is content, the memo including information about the content may be generated. In addition, when the object is an application icon, an application corresponding to the object is determined to be the application related to the memo in operation 730, whereby the memo based on the object may be generated.

The database according to an embodiment of the present disclosure may store a plurality of app diaries respectively corresponding to applications. An app diary may include at least one memo related to an application corresponding to the app diary.

Accordingly, according to an embodiment of the present disclosure, as a memo is stored in the app diary corresponding to the application related to the memo, memos stored in relation to a particular application may be easily retrieved.

In addition, when, in operation 720, an operation of retrieving a memo is determined to be the operation corresponding to the bent region, the electronic device 1000 may determine the application related to the object indicated by the bent region, in operation 760.

According to an embodiment of the present disclosure, as in operation 730, the operation of determining the application related to the object may be additionally performed. According to an embodiment of the present disclosure, the application related to the object may be determined to be one of an application currently running on the electronic device 1000, an application selected according to the user input from among the plurality of applications, and an application represented by the application icon corresponding to the object.

The present disclosure is not limited to the example set forth above, and in operation 760, the application related to the memo may be determined by various methods.

In operation 770, the electronic device 1000 may access the app diary corresponding to the application determined in operation 760 from among the app diaries stored in the database, and thus, may retrieve the memo. According to an embodiment of the present disclosure, a memo related to the object indicated by the bent region may be retrieved.

For example, when the object indicated by the bent region is content, the electronic device 1000 may retrieve a memo related to the content from an app diary of the application determined in operation 760. In addition, when the object indicated by the bent region is an application icon, the electronic device 1000 may retrieve the memo related to the object by retrieving the memo included in the app diary of the application, which corresponds to the object.

In operation 780, the electronic device 1000 may obtain at least one memo stored in the accessed app diary in the database, and in operation 790, the electronic device 1000 may provide the obtained memo to the user.

Figure 8:
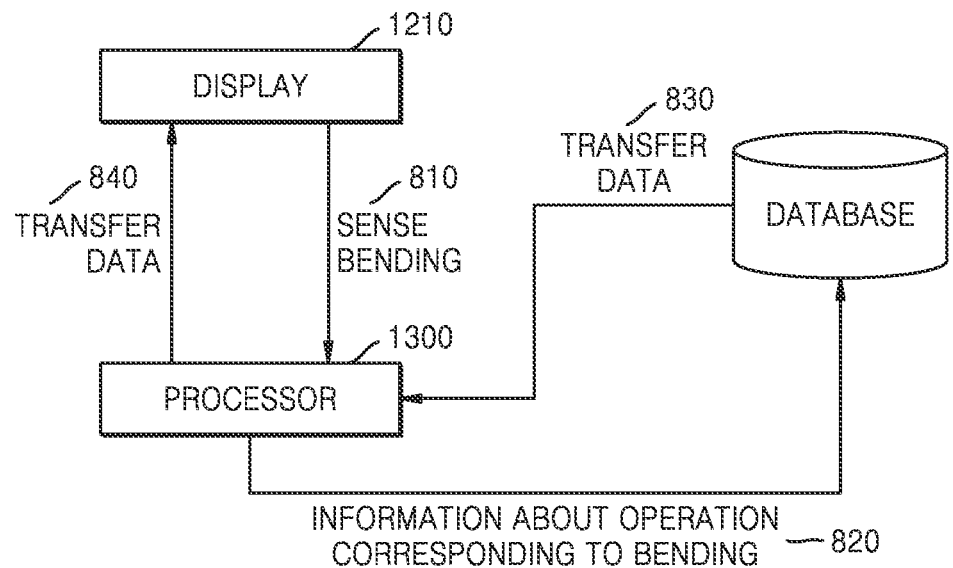
FIG. 8 is a block diagram illustrating an example of an operation performed by an electronic device according to sensing bending, according to an embodiment of the present disclosure.

FIG. 8 is a block diagram illustrating an example of an operation performed by the electronic device 1000 according to sensing bending, according to an embodiment of the present disclosure.

Referring to FIG. 8, the electronic device 1000 may include the display 1210, the processor 1300, and a database 1740. According to an embodiment of the present disclosure, the display 1210 and the processor 1300 in FIG. 8 may respectively correspond to the display 1210 and the processor 1300 in FIGS. 4 and 5. In addition, according to an embodiment of the present disclosure, the database 1740 of FIG. 8 may be stored in the memory 1700 of FIGS. 4 and 5.

In operation 810, the display 1210 may sense bending that deforms a shape of the display 1210. The display 1210 bent according to an embodiment of the present disclosure may include a material capable of being bent by a user in some or all regions thereof. For example, the display 1210 may include a flexible display.

According to an embodiment of the present disclosure, as the display 1210 senses the bending of a certain region of the display 1210, the display 1210 may determine the bending-sensed region and may transfer information about the determined region to the processor 1300. For example, the information about the bent region may include information about where the bent region is located on the display 1210, and information for determining which object the bent region indicates from among objects displayed on the display 1210.

The information for determining which object the bent region indicates from among the objects displayed on the display 1210 may include, for example, information about a position, which is touched by the bent region, on the display 1210, information about which position the bent region vertically corresponds to on the display 1210, and the like.

In addition, according to an embodiment of the present disclosure, the information about the bent region may include information such as a bending strength, a bending direction (for example, whether the electronic device 1000 is bent in a forward or backward direction of the display 1210), a bending angle (for example, an angle at which the electronic device 1000 is bent by the bending), a bending position (for example, a position on the display 1210, to which the electronic device 1000 is folded or bent and thus corresponds), or the like. According to an embodiment of the present disclosure, the information about the bent region is not limited to the examples set forth above and may include information for determining what operation the electronic device 1000 is to perform according to the bending.

In operation 810, as the processor 1300 receives the information about the bent region from the display 1210, the processor 1300 may determine an operation to be performed by the electronic device 1000 in correspondence with the bending, based on the information about the bent region.

According to an embodiment of the present disclosure, the processor 1300 may determine one of an operation of generating a memo and an operation of retrieving a memo, based on the information about the bent region. For example, the processor 1300 may determine one of the operation of generating a memo and the operation of retrieving a memo, based on where the bent region is located on the display 1210.

In addition, the processor 1300 may identify what object the bent region indicates, based on the information about the bent region, and may perform the operation of generating a memo or the operation of retrieving a memo, based on the identified object.

According to an embodiment of the present disclosure, the object indicated by the bent region may be identified according to the information for determining which object the bent region indicates from among the objects displayed on the display 1210.

In addition, the processor 1300 may determine an application related to the identified object. The application related to the object may be determined from among, for example, a currently running application, an application represented by the object, and an application selected according to a user input.

When the operation of generating a memo is determined according to the position of the bent region, the processor 1300 according to an embodiment of the present disclosure may determine a particular operation of generating a memo related to the object. For example, when the identified object is content, the processor 1300 may determine an operation of generating a memo including the object. In addition, when the identified object is an application icon, the processor 1300 may perform an operation of generating a memo and adding the generated memo to an app diary corresponding to the application icon, according to an embodiment of the present disclosure.

Further, when the operation of retrieving a memo is determined according to the position of the bent region on the electronic device 1000, the processor 1300 according to an embodiment of the present disclosure may determine a particular operation of retrieving a memo related to the object. For example, when the identified object is content, the processor 1300 may determine an operation of retrieving a memo related to the content. In addition, when the identified object is an application icon, the processor 1300 may determine an operation of retrieving a memo stored in an app diary corresponding to the application icon.

In operation 820, to perform the determined operation, the processor 1300 may access the database 1740. In the case of an operation of generating a memo, the processor 1300 may store the generated memo in the database 1740. The processor 1300 may be operated to allow the user to check a result of performing the operation, by transferring a result of storing the memo to the display 1210.

In addition, in the case of an operation of retrieving a memo, the processor 1300 may retrieve a memo stored in the database 1740. In operation 830, the processor 1300 may receive data regarding the retrieved memo from the database 1740, and in operation 840, the processor 1300 may be operated to allow the user to check the retrieved memo by transferring the received data to the display 1210.

Figure 9:
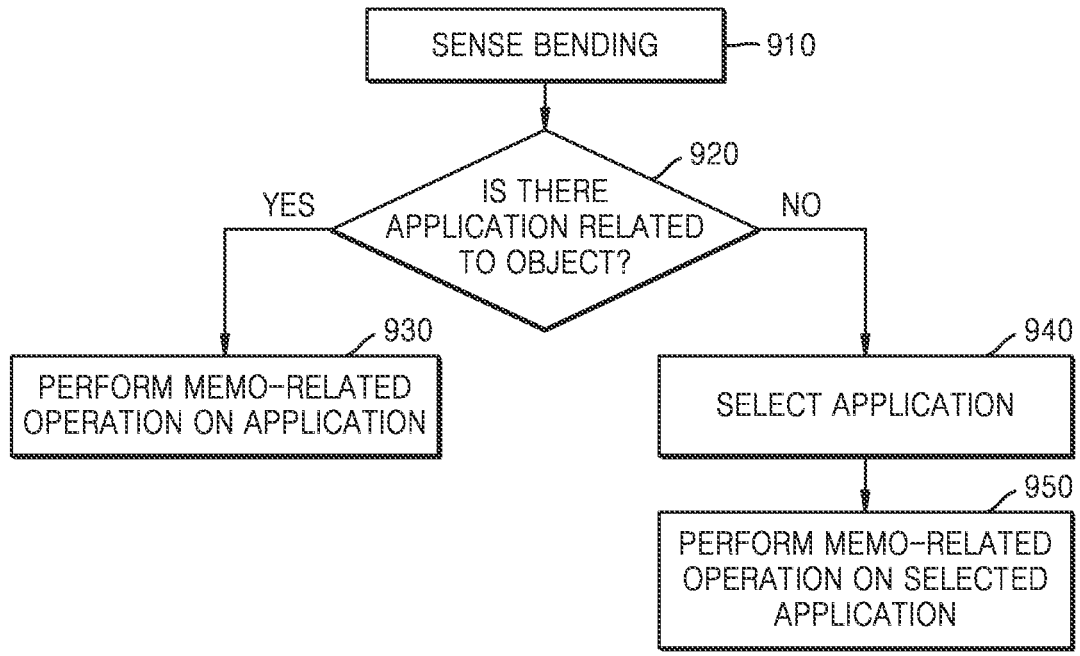
FIG. 9 is a flowchart illustrating a method of performing an operation related to an application, according to an embodiment of the present disclosure.

FIG. 9 is a flowchart illustrating a method of performing an operation related to an application, according to an embodiment of the present disclosure.

Referring to FIG. 9, in operation 910, the electronic device 1000 may sense bending that deforms the shape of the electronic device 1000. According to an embodiment of the present disclosure, the electronic device 1000 may sense bending that deforms a shape of a flexible display of the electronic device 1000 and may perform an operation corresponding to a bent region. For example, according to where the bent region is located in the electronic device 1000, one of an operation of generating a memo and an operation of retrieving a memo may be performed.

In operation 920, the electronic device 1000 may identify an object indicated by the bent region and may determine whether there is an application related to the identified object.

According to an embodiment of the present disclosure, when the identified object is included in an application execution screen, the electronic device 1000 may perform an operation related to a memo, based on the application, in operation 930.

According to an embodiment of the present disclosure, the electronic device 1000 may determine the application regarding the application execution screen, which includes the object identified by the bent region, as an application regarding the object.

For example, in the case of an operation of generating a memo, the electronic device 1000 may add a memo including information related to the object to an app diary of the determined application. In addition, in the case of an operation of retrieving a memo, the electronic device 1000 may retrieve the memo including the information related to the object from memos included in the app diary of the determined application.

For example, when the object indicated by the bent region is one of a plurality of pieces of video content included in an execution screen of a video retrieval application, the electronic device 1000 may add a memo regarding the piece of video content indicated by the bent region to an app diary of the video retrieval application.

Accordingly, according to an embodiment of the present disclosure, a user may easily retrieve a memo related to an application by using an app diary of the application.

In addition, according to an embodiment of the present disclosure, when the identified object represents information related to an application, the electronic device 1000 may perform a memo-related operation on the application, in operation 930. For example, when the object includes information generated by an application or the object is an icon representing the application, a memo-related operation may be performed on the application.

For example, in the case of an operation of generating a memo, the electronic device 1000 may add a memo including the information related to the object to an app diary of an application related to the object.

In addition, in the case of an operation of retrieving a memo, the electronic device 1000 may retrieve the memo including the information related to the object from memos included in the app diary of the application related to the object.

Further, when there is no application related to the object identified by the bent region, an operation of determining the application related to the object, in operation 940.

For example, when an object displayed on a wallpaper or a launcher screen of the electronic device 1000 is indicated by the bent region, a memo-related operation may be performed according to operations 940 and 950.

According to an embodiment of the present disclosure, the electronic device 1000 may display an application list to determine the application related to the object and may select one of applications included in the application list according to a user input.

In operation 950, the electronic device 1000 may perform a memo-related operation on an app diary of the application selected in operation 940.

For example, in the case of an operation of generating a memo, the electronic device 1000 may add a memo including the information related to the object to the app diary of the selected application.

For example, in the case of an operation of retrieving a memo, the electronic device 1000 may retrieve the memo including the information related to the object from memos included in the app diary of the selected application.

Figure 10:
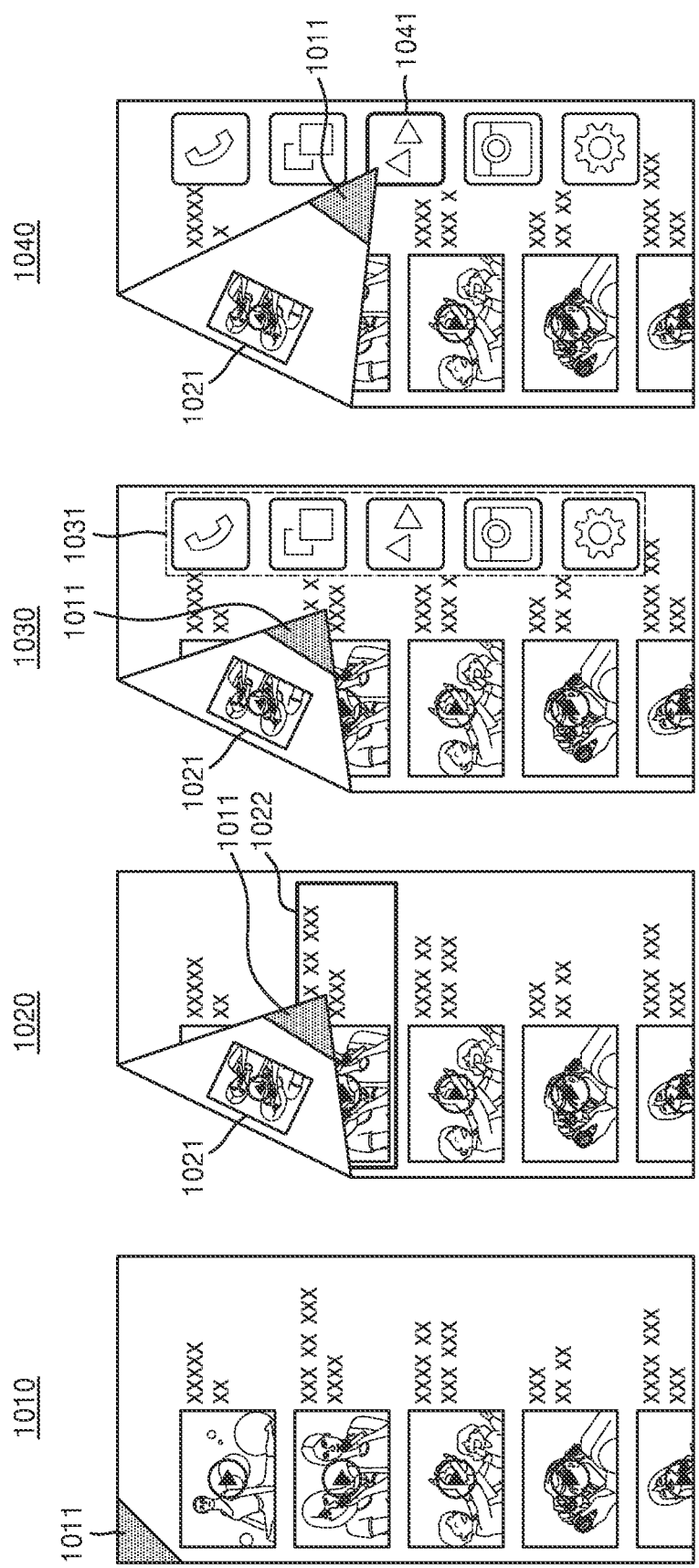
FIG. 10 is a diagram illustrating an example of generating a memo, according to an embodiment of the present disclosure.

FIG. 10 is a diagram illustrating an example of generating a memo, according to an embodiment of the present disclosure.

Referring to 1010 of FIG. 10, an execution screen of an application capable of retrieving video content may be displayed on the electronic device 1000, and a plurality of pieces of video content may be included in the execution screen of the application.

Referring to 1020 of FIG. 10, a region 1011 of the electronic device 1000 may be bent, and the bent region 1011 may indicate a piece of content 1022 displayed on the execution screen of the application.

According to an embodiment of the present disclosure, the electronic device 1000 may display identification information 1021 representing the content 1022 on a display screen located in the bent region 1011. For example, when a certain region of a display on a rear surface of the electronic device 1000 faces forward as the electronic device 1000 is bent, information related to an operation caused by the bending may be displayed on the forward-facing region of the display.

According to an embodiment of the present disclosure, the identification information 1021 representing the content 1022 may include various types of information such as a thumbnail representing the content 1022, a name of the content 1022, an icon representing the content 1022, and the like.

The present disclosure is not limited to the example set forth above, and the information related to the operation performed according to the bending of the electronic device 1000, according to an embodiment of the present disclosure, may be displayed on various regions of the display of the electronic device 1000.

According to an embodiment of the present disclosure, a memo may be generated based on the information related to the identified content 1022, and the generated memo may be added to an app diary of a video retrieval application displaying the content 1022.

In addition, according to an embodiment of the present disclosure, even when the content 1022 identified by the bent region 1011 is displayed on the execution screen of the application, an operation of determining an application related to the memo may be additionally performed, according to a user input or preset information. According to an embodiment of the present disclosure, the memo may be added to an app diary regarding the determined application.

Referring to 1030 of FIG. 10, to determine the application related to the memo, the electronic device 1000 may display an application list 1031, based on the information related to the content 1022. The application list 1031 may be displayed to be overlaid on the execution screen of the video retrieval application that is currently running.

The application list 1031 according to an embodiment of the present disclosure may be determined by various methods, based on various pieces of information such as a usage history of each application, a user preference for each application, a relation to the content 1022, and the like.

Referring to 1040 of FIG. 10, as in the case of identifying the content 1022, the electronic device 1000 may identify an application 1041 indicated by the bent region 1011 from the application list 1031.

The electronic device 1000 according to an embodiment of the present disclosure may generate a memo including the information related to the content 1022 according to an input by a user and may store the generated memo in an app diary of the identified application 1041 by adding the generated memo to the app diary.

Figure 11:
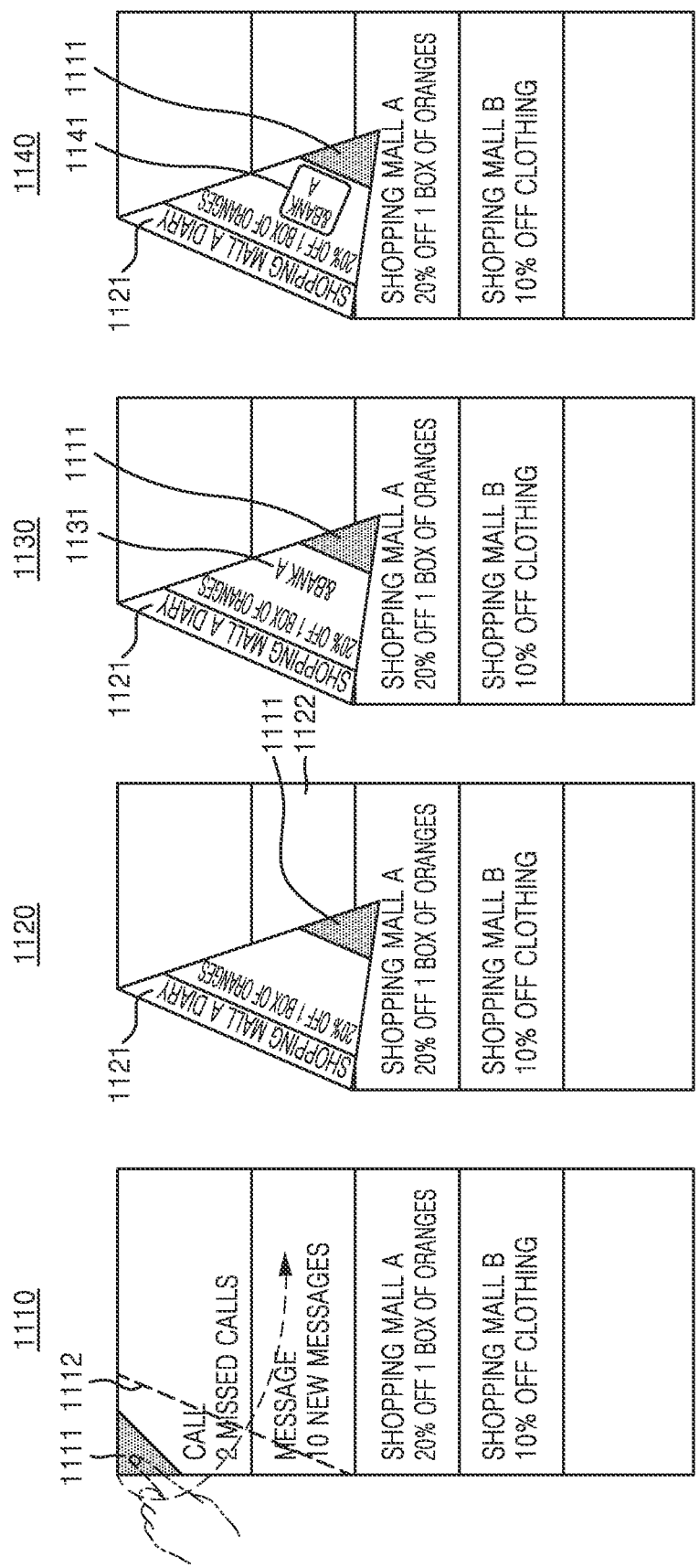
FIG. 11 is a diagram illustrating an example of generating a memo, according to an embodiment of the present disclosure.

FIG. 11 is a diagram illustrating an example of generating a memo, according to an embodiment of the present disclosure.

Referring to 1110 of FIG. 11, various notification messages generated by a plurality of applications may be displayed on a display screen of the electronic device 1000.

According to an embodiment of the present disclosure, a region 1111 of the electronic device 1000 may be bent about a marked line 1112 in an arrow direction, and as shown in 1120 of FIG. 11, the bent region 1111 may indicate a notification message 1122 from among a plurality of notification messages displayed on a display.

According to an embodiment of the present disclosure, the electronic device 1000 may identify the notification message 1122 indicated by the bent region 1111 and may display information about the identified notification message 1122 on a display screen located in the bent region 1111.

In addition, according to an embodiment of the present disclosure, the electronic device 1000 may determine that the notification message 1122 is generated by a "shopping mall A" application. Accordingly, the electronic device 1000 may determine the "shopping mall A" application as an application related to the notification message 1122. According to an embodiment of the present disclosure, the electronic device 1000 may display, on the display screen of the bent region 1111, a "shopping mall A diary" 1121 as information about the application determined to be an application related to a memo. The display of the "shopping mall A diary" 1121 may represent that a memo generated by the bent region 1111 is added to and stored in an app diary regarding the "shopping mall A" application.

Referring to 1130 of FIG. 11, identification information 1131 of another application, which is input by a user, may be displayed. According to an embodiment of the present disclosure, to additionally store information about the other application related to the memo generated by the bent region 1111, the user may input the identification information 1131 of a "bank A".

For example, as in the example shown in 1130 of FIG. 11, identification information of an application may be additionally input after "&" is input. As in the example shown in 1140 of FIG. 11, the electronic device 1000 may display an icon 1141 corresponding to the application additionally input according to a user input.

According to an embodiment of the present disclosure, the memo generated by the bent region 1111 may be stored in an app diary regarding a "shopping mall A", and a "bank A" application may be additionally stored as an application related to the memo.

Figure 12:
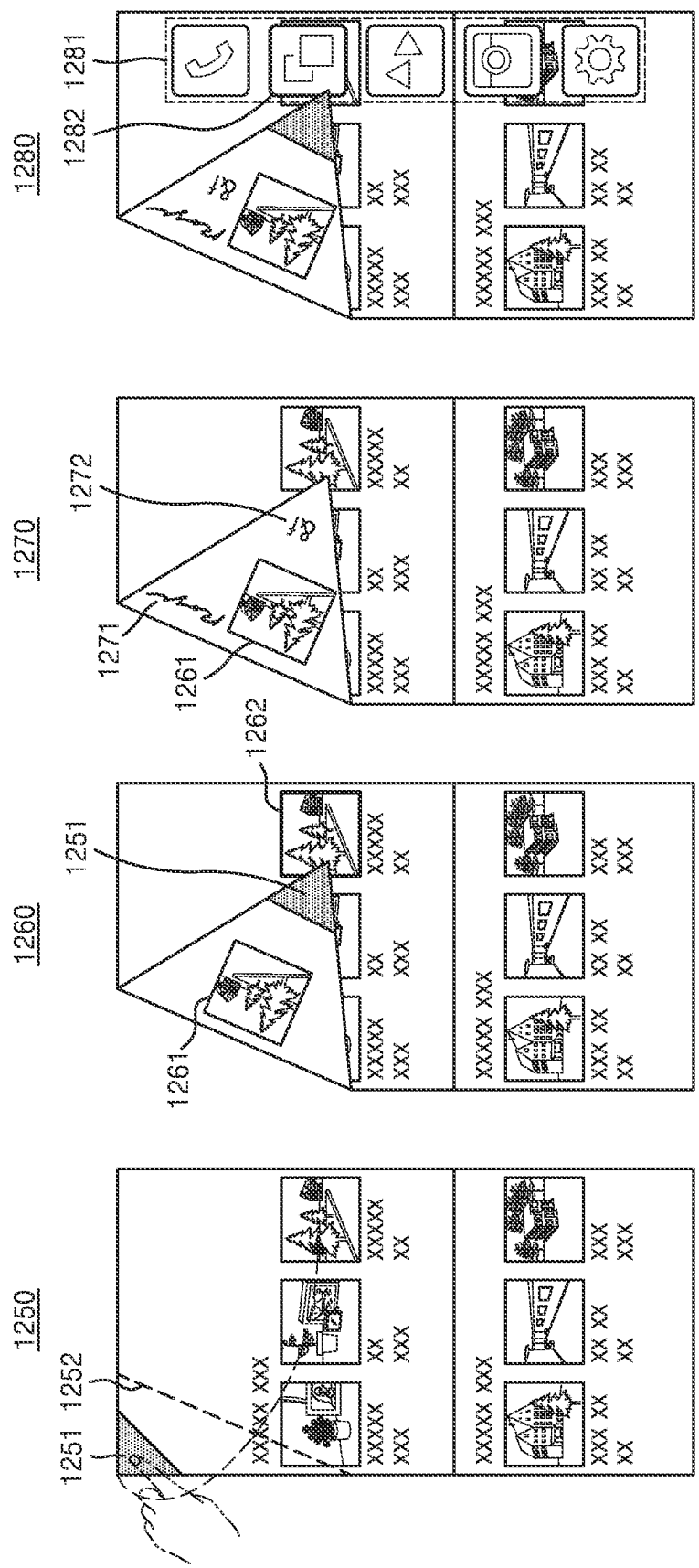
FIG. 12 is a diagram illustrating an example of generating a memo, according to an embodiment of the present disclosure.

FIG. 12 is a diagram illustrating an example of generating a memo, according to an embodiment of the present disclosure.

Referring to 1250 of FIG. 12, an execution screen of an application, which includes various pieces of content, may be displayed on a screen of the electronic device 1000.

Referring to 1260 of FIG. 12, a region 1251 of the electronic device 1000 may be bent, and the bent region 1251 may indicate a piece of content 1262 displayed on the execution screen of the application. According to an embodiment of the present disclosure, the electronic device 1000 may display identification information 1261 representing the content 1262 on a display screen of the bent region 1251.

Referring to 1270 of FIG. 12, a memo generated by the bent region 1251, according to an embodiment of the present disclosure, may be generated to further include information 1271 that is input by a user. The information 1271 input by the user may include information input by various methods, for example, a touch, a speech, and the like, via the electronic device 1000.

According to an embodiment of the present disclosure, the memo may be generated based on information related to the identified content 1262, and the generated memo may be added to an app diary of the application displaying the content 1262.

In addition, according to an embodiment of the present disclosure, even when the content 1262 identified by the bent region is displayed on the execution screen of the application according to a user input or preset information, an operation of determining an application related to the memo may be additionally performed. According to an embodiment of the present disclosure, the memo may be added to an app diary regarding the determined application.

For example, to determine the application related to the memo, the user may input "&" and may additionally input f for determining the application related to the memo. As shown in 1280 of FIG. 12, the electronic device 1000 may display a list 1281 of applications beginning with f. The bent region 1251 indicates an application 1282 in the application list 1281, whereby the application related to the memo may be determined. Accordingly, the memo generated by the bent region may be added to and thus stored in an app diary of the application 1282 determined to be the application related to the memo.

Figure 13:
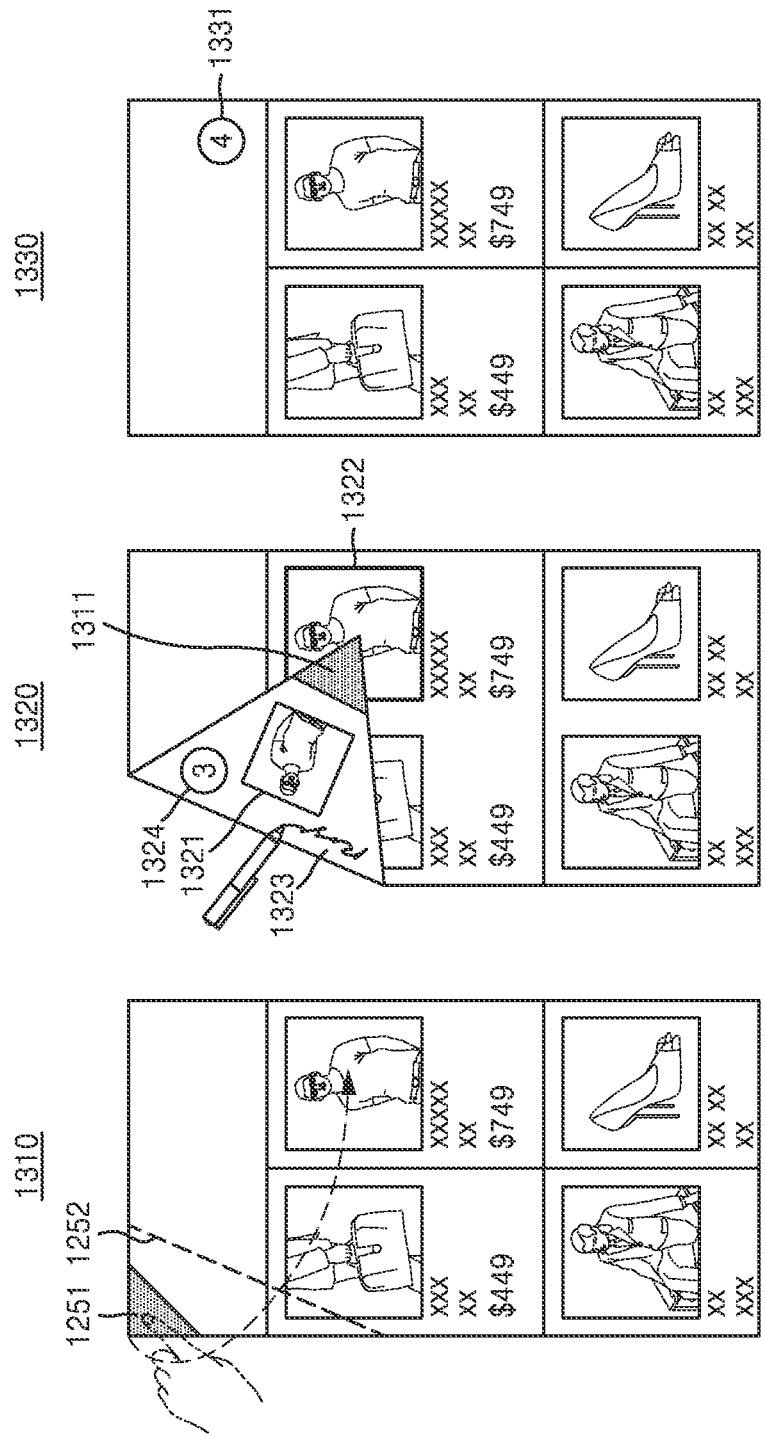
FIG. 13 is a diagram illustrating an example of generating a memo, according to an embodiment of the present disclosure.

FIG. 13 is a diagram illustrating an example of generating a memo, according to an embodiment of the present disclosure.

Referring to 1310 of FIG. 13, an execution screen of an application, which includes various pieces of content, may be displayed on the display screen of the electronic device 1000.

Referring to 1320 of FIG. 13, a region 1311 of the electronic device 1000 may be bent, and the bent region 1311 may indicate a piece of content 1322 displayed on the execution screen of the application. According to an embodiment of the present disclosure, the electronic device 1000 may display identification information 1321 representing the content 1322 on a display screen of the bent region 1311.

In addition, a memo generated by the bent region 1311, according to an embodiment of the present disclosure, may be generated to further include information 1323 that is input by a user.

According to an embodiment of the present disclosure, the memo may be generated based on information related to the identified content 1322, and the generated memo may be added to an app diary of the currently running application by which the content 1322 is displayed.

In addition, as shown in 1320 of FIG. 13, the number of memos 1324 stored in the app diary of the currently running application may be displayed on the display screen of the bent region 1311. "3" shown in 1320 of FIG. 13 may represent that the number of memos stored in the app diary of the application displayed on the electronic device 1000 is 3.

According to an embodiment of the present disclosure, when a memo including the content 1322 is generated as the electronic device 1000 is bent, the number of memos stored in the app diary of the application displayed on the electronic device 1000 may be increased to 4. According to an embodiment of the present disclosure, as shown in 1330 of FIG. 13, an indication 1331 representing that the number of memos stored in the app diary of the application displayed on the electronic device 1000 is 4 may be displayed on the display screen of the electronic device 1000.

Figure 14:
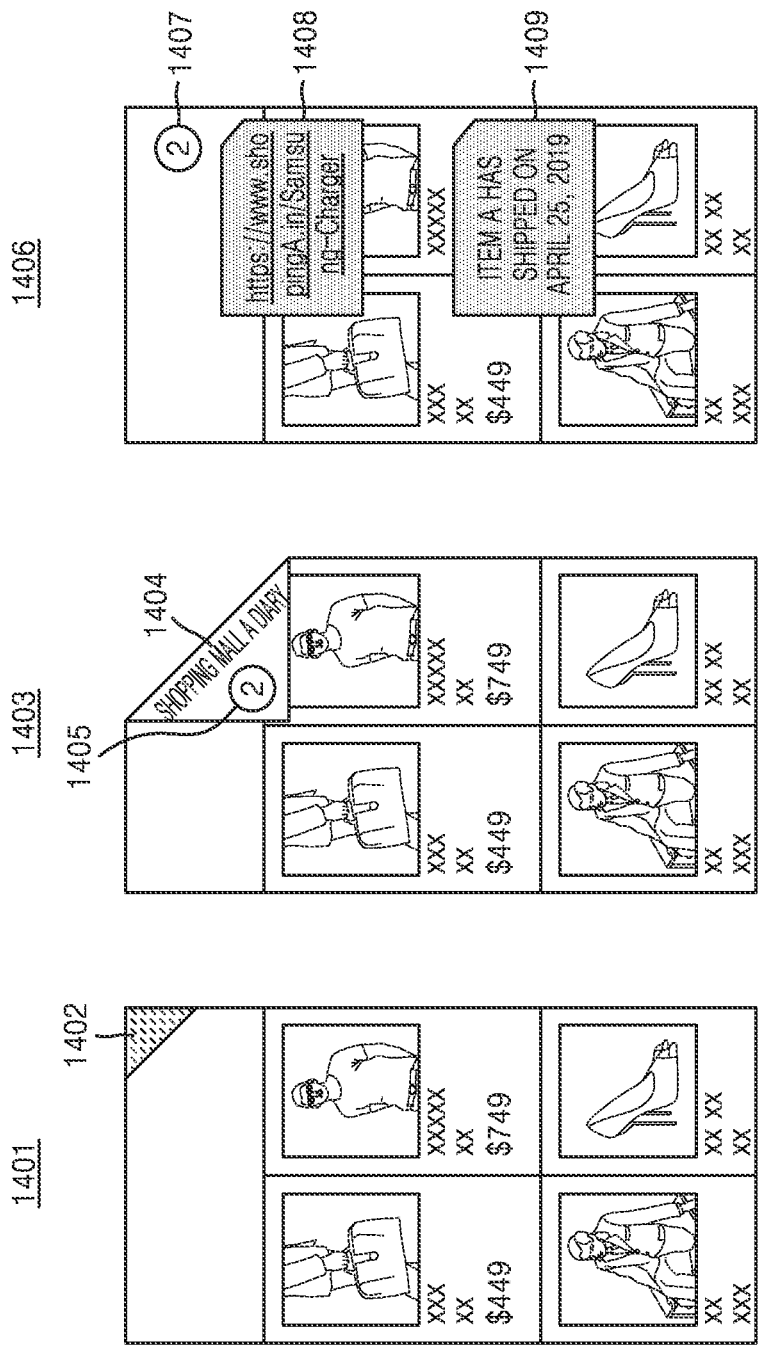
FIG. 14 is a diagram illustrating an example of retrieving a memo, according to an embodiment of the present disclosure.

FIG. 14 is a diagram illustrating an example of retrieving a memo, according to an embodiment of the present disclosure.

Referring to 1401 of FIG. 14, an execution screen of an application including various pieces of content may be displayed on the screen of the electronic device 1000.

Referring to 1403 of FIG. 14, a region 1402 of the electronic device 1000 may be bent. As the bent region 1402 corresponds to an operation of retrieving a memo, the electronic device 1000 may perform the operation of retrieving a memo.

According to an embodiment of the present disclosure, as the region 1402 is bent, the electronic device 1000 may perform an operation of retrieving a memo stored in an app diary of a currently displayed application. As in the example shown in 1403 of FIG. 14, information 1404 representing the app diary of the currently displayed application, and the number of memos 1405 stored in the app diary of the currently displayed application may be displayed.

In 1406 of FIG. 14, according to a user input, the electronic device 1000 may display memos 1408 and 1409 stored in the app diary of the currently displayed application together with the number of memos 1407 stored in the app diary of the currently displayed application.

Figure 15:
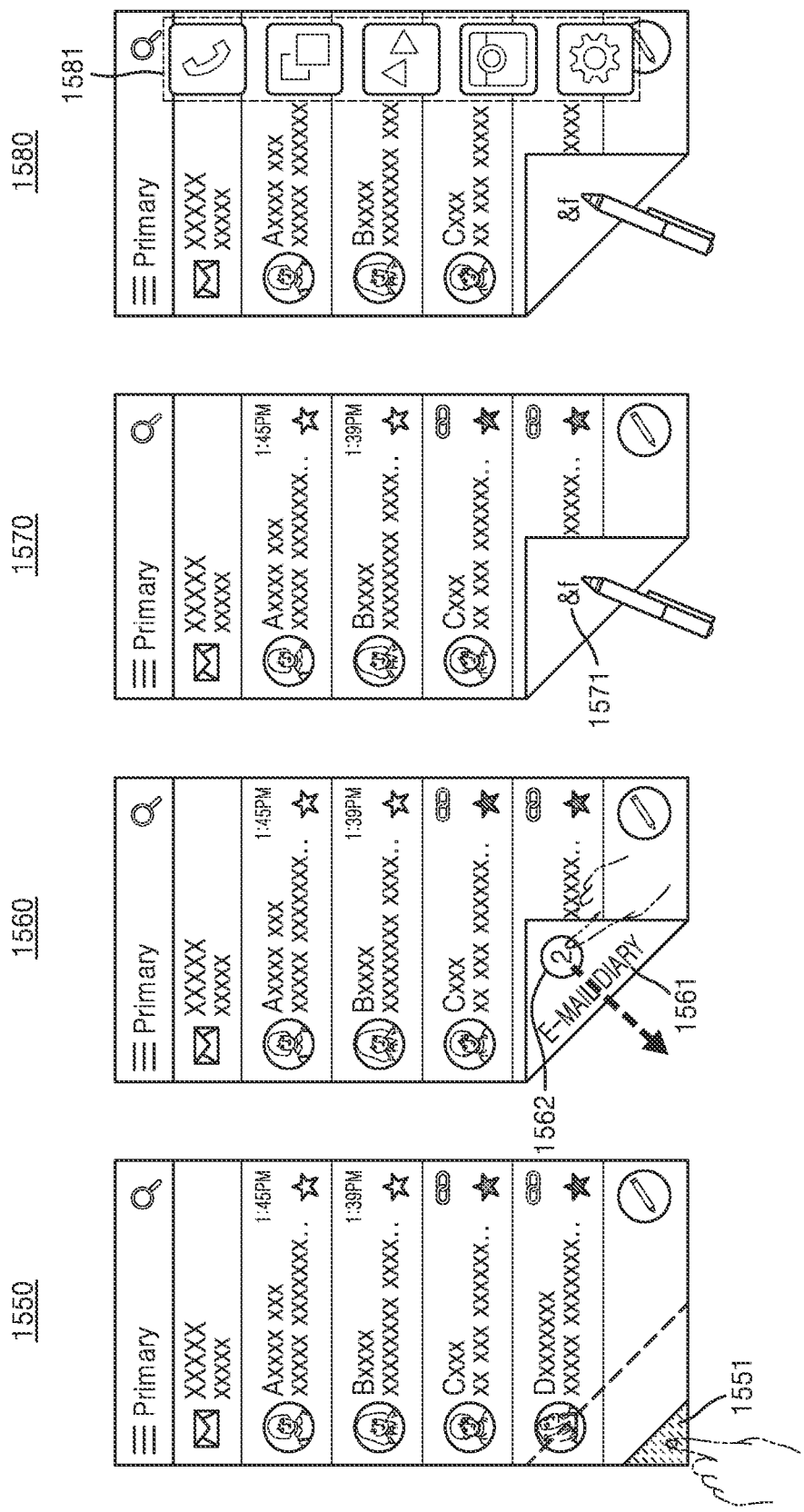
FIG. 15 is a diagram illustrating an example of retrieving a memo, according to an embodiment of the present disclosure.

FIG. 15 is a diagram illustrating an example of retrieving a memo, according to an embodiment of the present disclosure.

Referring to 1550 of FIG. 15, an execution screen of an application including various pieces of content may be displayed on the screen of the electronic device 1000.

Referring to 1560 of FIG. 15, a region 1551 of the electronic device 1000 may be bent. As the bent region 1551 corresponds to an operation of retrieving a memo, the electronic device 1000 may perform the operation of retrieving a memo.

According to an embodiment of the present disclosure, as the region 1551 is bent, the electronic device 1000 may perform an operation of retrieving a memo stored in an app diary of a currently displayed application. As in the example shown in 1560 of FIG. 15, information 1561 representing the app diary of the currently displayed application, and the number of memos 1562 stored in the app diary of the currently displayed application may be displayed.

Referring to 1570 of FIG. 15, the electronic device 1000 may perform an operation of retrieving a memo stored in an app diary of a different application from the currently displayed application, according to a user input. According to an embodiment of the present disclosure, as "&f" 1571 is input by a user, the electronic device 1000 may display a list 1581 of applications beginning with f, as shown in 1580 of FIG. 15.

According to an embodiment of the present disclosure, from the list 1581 of applications, an application indicated by the bent region 1551 may be selected or an application may be selected by a touch input by the user. The electronic device 1000 may perform an operation of retrieving a memo stored in an app diary of the selected application.

FIG. 16 is a diagram illustrating an example of generating a memo, according to an embodiment of the present disclosure.

Referring to 1650 of FIG. 16, as a region 1651 of the electronic device 1000 is bent, the electronic device 1000 may perform an operation of generating a memo from content 1652 indicated by the bent region 1651. According to an embodiment of the present disclosure, in the operation of generating the memo, the electronic device 1000 may further perform an operation of setting an operation condition for an application related to the memo.

Accordingly, according to an embodiment of the present disclosure, an operation condition may be additionally set for an application determined to be the application related to the content 1652 indicated by the bent region 1651, and an operation may be performed on the content 1652, based on the set operation condition. For example, a memo regarding the content 1652, which includes the set operation condition, may be generated, and when the operation condition included in the generated memo is satisfied, an operation set in relation to the content 1652 and the application may be performed.

The set operation set forth above may be preset to be an operation to be performed on the content 1652 by the application, as the set operation condition is satisfied.

According to an embodiment of the present disclosure, the electronic device 1000 may display a list 1653 including a plurality of operation conditions, based on an input by a user or preset information. The list 1653 of the operation conditions may include, for example, conditions regarding a data usage limit, remaining battery power, Wi-Fi connection or not, and the like. According to an embodiment of the present disclosure, the electronic device 1000 may select an operation condition 1654 indicated by the bent region 1651.

In 1660 of FIG. 16, when the operation condition 1654 is selected, the electronic device 1000 may display an application list 1661 for determining an application related to a memo. An SNS application 1662 in the application list 1661 may be selected to be the application related to the memo, by the bent region 1651.

According to an embodiment of the present disclosure, the electronic device 1000 may set an operation condition of the SNS application 1662 related to the content 1652, based on the content 1652, the operation condition 1654, and the SNS application 1662, which are selected by the bent region 1651.

For example, when a data usage limit of the electronic device 1000 is renewed, the electronic device 1000 may set the content 1652 to be processed by the SNS application 1662, according to the operation condition 1654. For example, the content 1652 may be set to be uploaded to a user account via the SNS application 1662.

According to an embodiment of the present disclosure, the electronic device 1000 may generate a memo from information about an operation condition of the SNS application 1662, which is set based on the content 1652, the SNS application 1662, and the operation condition 1654, and may store the memo in an app diary of the SNS application 1662. The electronic device 1000 according to an embodiment of the present disclosure may execute the SNS application 1662 according to the operation condition in the memo stored in the app diary of the SNS application 1662.

In 1670 of FIG. 16, according to an embodiment of the present disclosure, the electronic device 1000 may additionally display an icon 1671 representing that the operation condition is set for the SNS application 1662. The example shown in 1670 of FIG. 16 is provided merely as an example, and information representing that the operation condition is set for the SNS application 1662 may be displayed in various forms.

FIG. 17 is a diagram illustrating an example of an operation condition that may be set for an application, according to an embodiment of the present disclosure.

Referring to FIG. 17, a Wi-Fi icon 1701 may represent an operation condition regarding Wi-Fi connection or not. According to an embodiment of the present disclosure, in the case where, in a memo, the Wi-Fi icon 1701 is set to be an operation condition, when the electronic device 1000 is connected to Wi-Fi, the electronic device 1000 may be operated such that content of the memo is uploaded to a user account via an application (for example, an SNS app) related to the memo.

A battery icon 1702 may represent an operation condition regarding remaining battery power. According to an embodiment of the present disclosure, in the case where, in a memo, the battery icon 1702 is set to be an operation condition, when the remaining battery power of the electronic device 1000 is equal to or less than a reference value (for example, 15%), the electronic device 1000 may be operated such that content of the memo is displayed via an application related to the memo.

A data network connection icon 1703 may represent an operation condition regarding data network connection. According to an embodiment of the present disclosure, in the case where, in a memo, the data network connection icon 1703 is set to be an operation condition, when the electronic device 1000 is connected to a data network (for example, 4th generation (4G) or 5G network, or the like), the electronic device 1000 may be operated to call a number stored in the memo via an application (for example, a calling app) related to the memo.

A data limit icon 1704 may represent an operation condition regarding a data limit. According to an embodiment of the present disclosure, in the case where, in a memo, the data limit icon 1704 is set to be an operation condition, when the electronic device 1000 is allowed to transmit and receive data via a network connected to the electronic device 1000 due to a renewal of a data limit available to the electronic device 1000, the electronic device 1000 may be operated such that, by using an application related to the memo, content is downloaded via a uniform resource locator (URL) stored in the memo.

A storage capacity limit icon 1705 may represent an operation condition regarding a storage capacity limit. According to an embodiment of the present disclosure, in the case where, in a memo, the storage capacity limit icon 1705 is set to be an operation condition, when a memory capacity available to the electronic device 1000 is equal to or greater than a reference value, the electronic device 1000 may be operated such that, by using an application related to the memo, content is downloaded via a URL stored in the memo.

Figure 18:
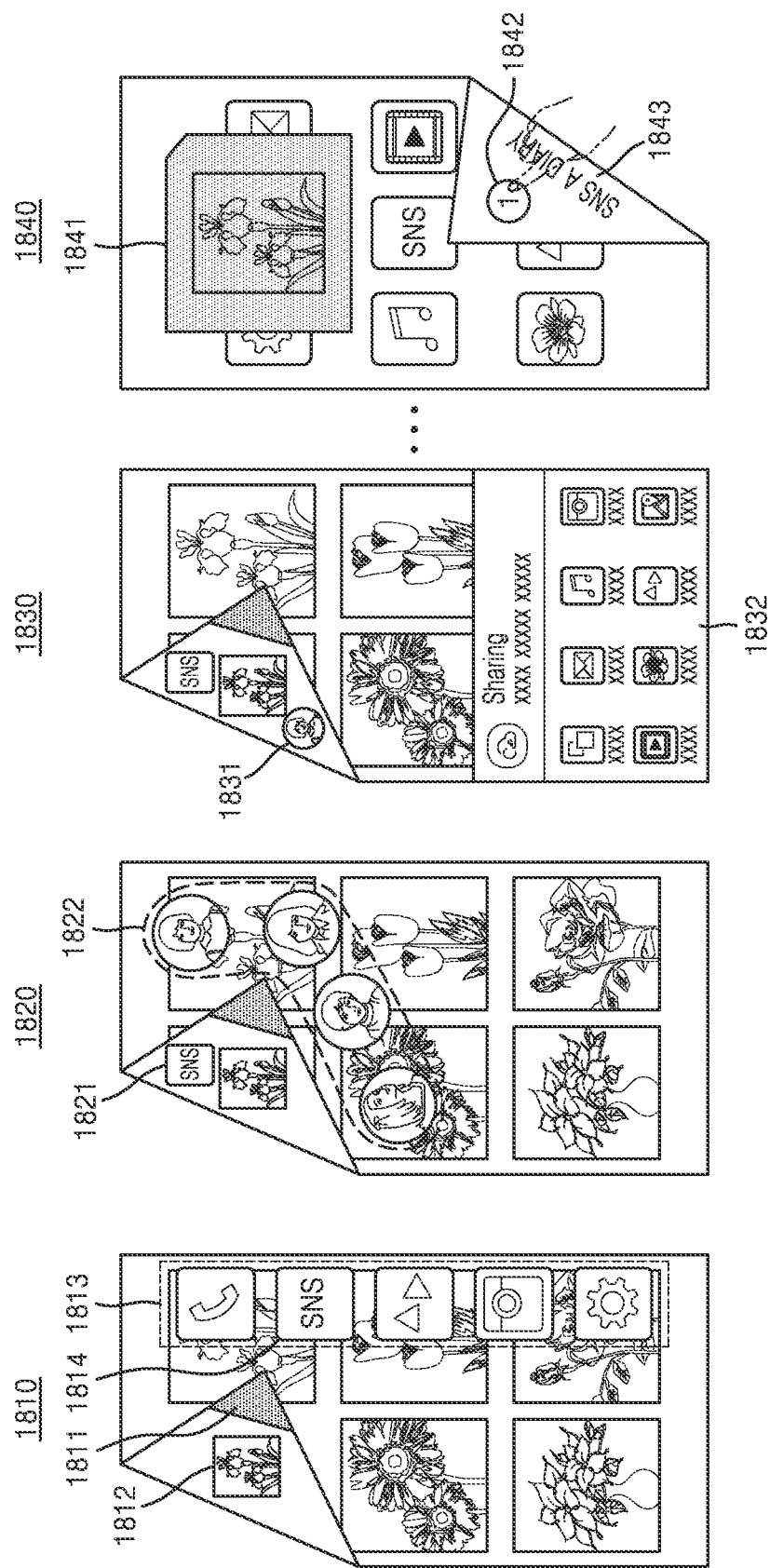
FIG. 18 is a diagram illustrating an example of sharing a memo with an external device, according to an embodiment of the present disclosure.

FIG. 18 is a diagram illustrating an example of sharing a memo with an external device (not shown), according to an embodiment of the present disclosure.

Referring to 1810 of FIG. 18, the electronic device 1000 may determine content 1812 that is to be included in a memo, according to an object indicated by a bent region 1811. In addition, according to the object indicated by the bent region 1811, the electronic device 1000 may select an application 1814 related to the memo from an application list 1813. In 1810 of FIG. 18, the selected application 1814 may correspond to an SNS A app shown in 1840 of FIG. 18.

Referring to 1820 of FIG. 18, content and an application 1821, which are selected by the bent region 1811, may be displayed on a display area of the bent region 1811.

In addition, the electronic device 1000 may determine a device that is to share a memo generated by the bent region 1811, according to the object indicated by the bent region 1811 or a touch input by a user. According to an embodiment of the present disclosure, the electronic device 1000 may display a list 1822 including identification information of another user that may share the memo. According to the object indicated by the bent region 1811, the electronic device 1000 may select the other user, who is to share the memo, from the list 1822 including the identification information of the other user.

Referring to 1830 of FIG. 18, the electronic device 1000 may display identification information 1831 about the other user who is to share the memo, on the display area of the bent region 1811. In addition, after the other user, who is to share the memo, is selected, the electronic device 1000 may select a method of sharing the memo, from a list 1832 including various methods of sharing the memo. For example, the electronic device 1000 may select the method of sharing the memo, by a touch input by the user or a touch input by the bent region 1811.

1840 of FIG. 18 illustrates an example of a screen of the external device (not shown) of the other user, who shares the memo via the electronic device 1000. When an operation of retrieving a memo is performed as bending that deforms a shape of the external device (not shown) is performed according to an embodiment of the present disclosure, the shared memo 1841 may be displayed. For example, when a bent region of the external device indicates an icon of the SNS A app, the external device (not shown) may display, on a display area of the bent region, an "SNS A diary" 1843 for representing that a memo included in an app diary of the SNS A app is retrieved. In addition, the number of memos 1842 stored in the app diary of the SNS A app may also be displayed. Further, when the number of memos 1842 is touched by a user input, the memo 1841 shared from the electronic device 1000 may be displayed on the external device (not shown).

Figure 19:
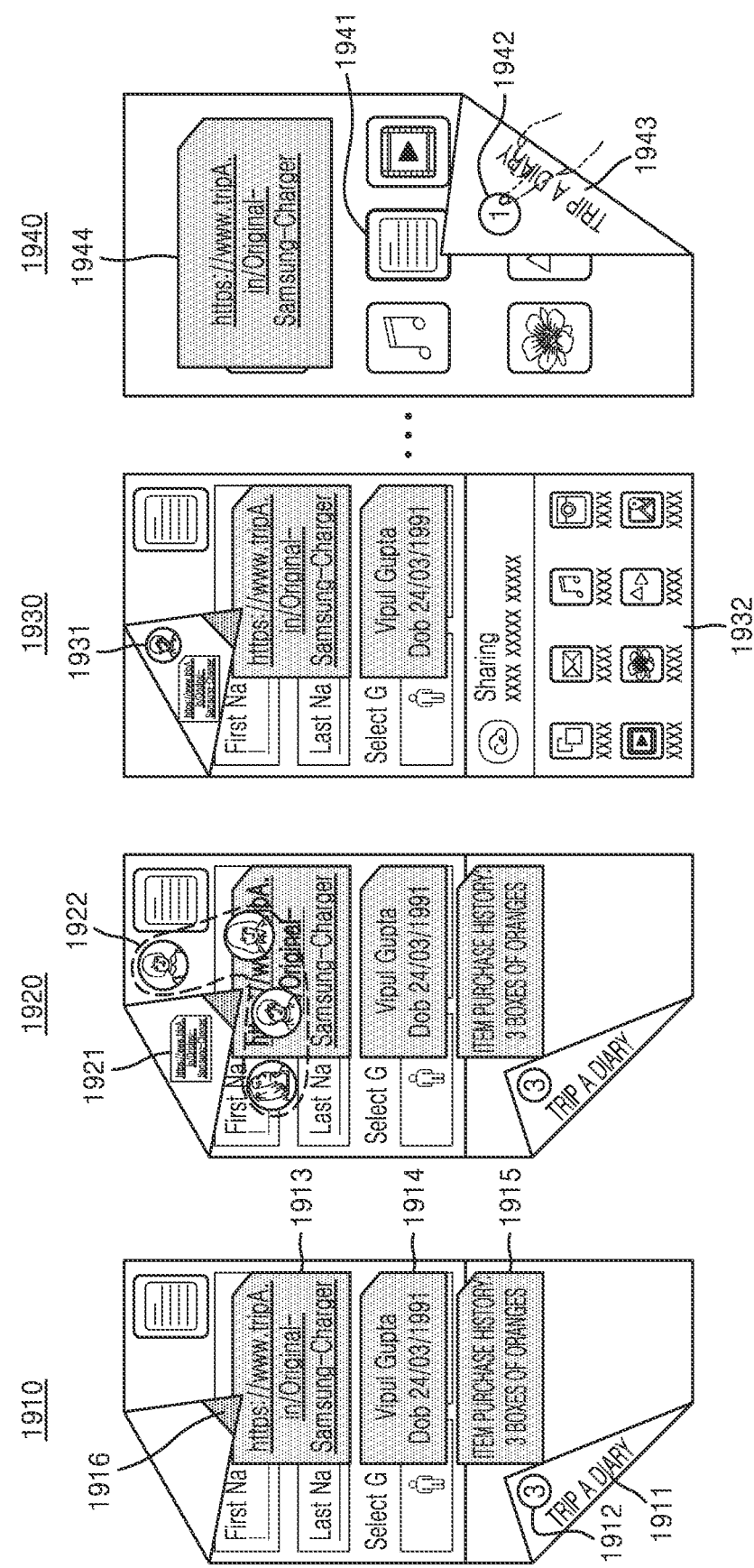
FIG. 19 is a diagram illustrating an example of sharing a memo with an external device, according to an embodiment of the present disclosure.

FIG. 19 is a diagram illustrating an example of sharing a memo with an external device (not shown), according to an embodiment of the present disclosure.

Referring to 1910 of FIG. 19, the electronic device 1000 may perform an operation of retrieving a memo, by sensing bending that deforms the shape of the electronic device 1000. According to an embodiment of the present disclosure, the electronic device 1000 may retrieve a memo stored in an app diary 1911 of a "trip A app", which is a currently running application, and may display retrieved memos 1913, 1914, and 1915. In addition, the electronic device 1000 may display the number of memos 1912 stored in the app diary 1911 of the "trip A app".

According to an embodiment of the present disclosure, by bending a certain region of the electronic device 1000, an operation of generating a memo may be performed. According to an embodiment of the present disclosure, a memo is generated and the generated memo is transferred to the external device (not shown), whereby an operation of sharing the memo may be performed.

Referring to 1920 of FIG. 19, the electronic device 1000 may determine that a bent region 1916 indicates a memo 1913 from among the memos retrieved in 1910 of FIG. 19. The memo 1913 indicated by the bent region 1916 may be generated as a new memo regarding the "trip A app", which is a currently running application.

In addition, according to an object indicated by the bent region 1916 or a touch input by a user, the electronic device 1000 may determine a device that is to share the memo generated by the bent region 1916. According to an embodiment of the present disclosure, the electronic device 1000 may display a list 1922 including identification information of another user that may share the memo. According to the object indicated by the bent region 1916, the electronic device 1000 may select the other user, who is to share the memo, from the list 1922 including the identification information of the other user.

Referring to 1930 of FIG. 19, the electronic device 1000 may display identification information 1931 about the other user who is to share the memo, on a display area of the bent region 1916. In addition, after the other user, who is to share the memo, is selected, the electronic device 1000 may select a method of sharing the memo, from a list 1932 including various methods of sharing the memo. For example, the electronic device 1000 may select the method of sharing the memo, by a touch input by the user or a touch input by the bent region 1916.

1940 of FIG. 19 illustrates an example of a screen of the external device (not shown) of the other user, who shares the memo via the electronic device 1000. When an operation of retrieving a memo is performed as the external device (not shown) according to an embodiment of the present disclosure is bent, the external device (not shown) may display a shared memo 1944. For example, when a bent region indicates an icon 1941 of the trip A app, the external device (not shown) may display, on a display area of the bent region, a "trip A diary" 1943 for representing that a memo included in an app diary of the travel A app is retrieved. In addition, the number of memos 1942 stored in the app diary of the trip A app may also be displayed. Further, when the number of memos 1942 is touched by a user input, the memo 1944 shared from the electronic device 1000 may be displayed on the external device (not shown).

Figure 20:
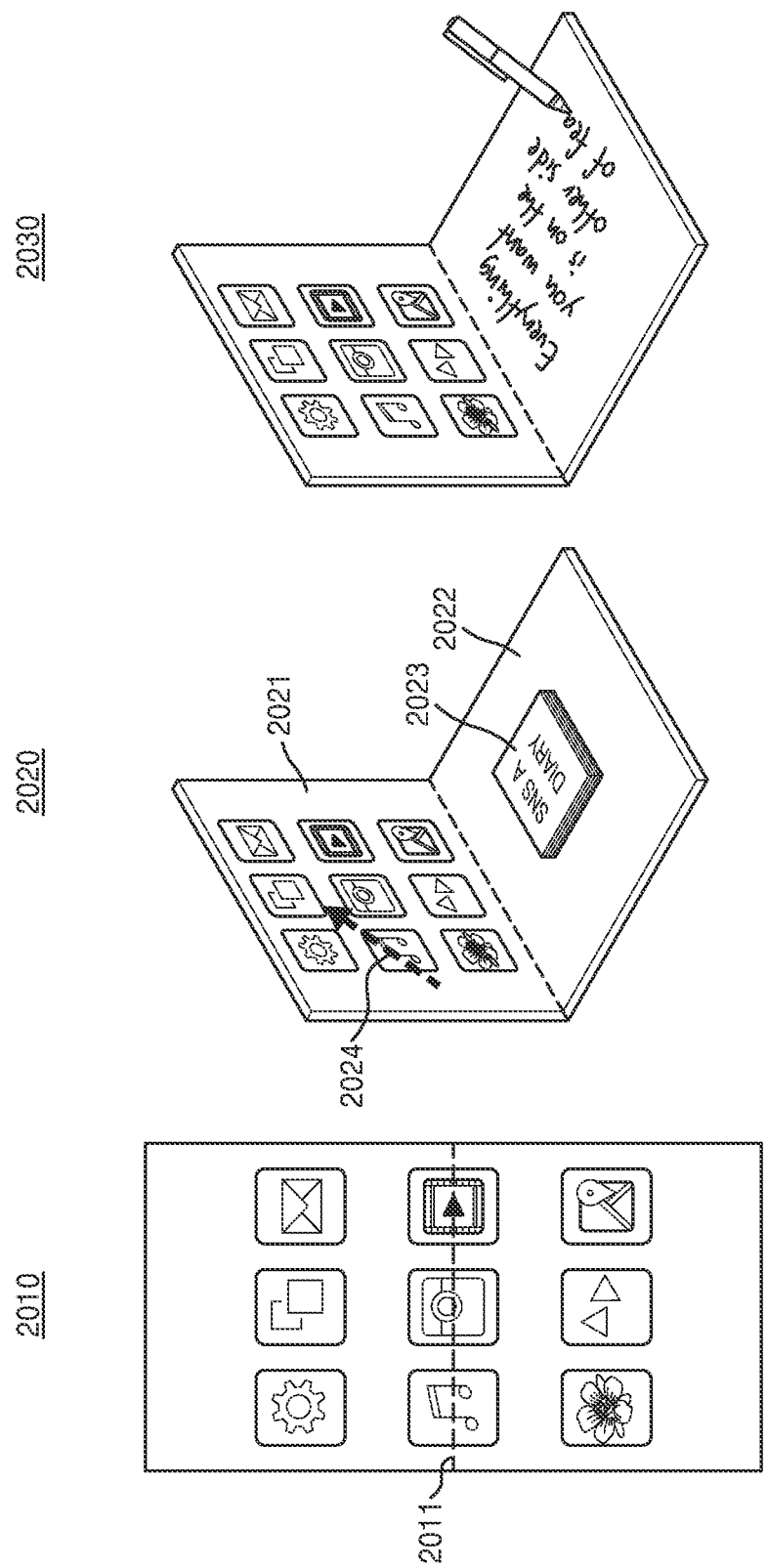
FIG. 20 is a diagram illustrating an example of bending an electronic device, according to an embodiment of the present disclosure.

FIG. 20 is a diagram illustrating an example of bending the electronic device 1000, according to an embodiment of the present disclosure.

Referring to 2010 and 2020 of FIG. 20, the electronic device 1000 may be bent about a central line 2011 of the display screen thereof. When the electronic device 1000 senses the bending of the display screen about the central line 2011, the display screen displayed before the bending of the electronic device 1000 may be displayed in reduced size on a display of an upper area 2021, as shown in 2020 of FIG. 20.

For example, a wallpaper or a launcher screen, which includes a plurality of application icons, may be displayed on the display of the upper area 2021. In addition, a user interface for generating a memo may be displayed on a display of a lower area 2022.

According to an embodiment of the present disclosure, according to a user input, an SNS A diary 2023, which is information representing an app diary where the memo is to be stored, may be displayed on the display of the lower area 2022. For example, in the upper area 2021, as a slide input 2024 in an arrow direction with respect to an icon of SNS A is received, an SNS A app diary may be determined to be the app diary where the memo is to be stored, and the SNS A diary 2023 may be displayed on the lower area 2022. The present disclosure is not limited to the slide input 2024, and the app diary where the memo is to be stored may be determined according to various user inputs.

Referring to 2030 of FIG. 20, in the lower area 2022, contents to be generated into a memo may be input by a user. The memo may be generated based on information input by the user, and the generated memo may be stored in the SNS A diary 2023.

Figure 21:
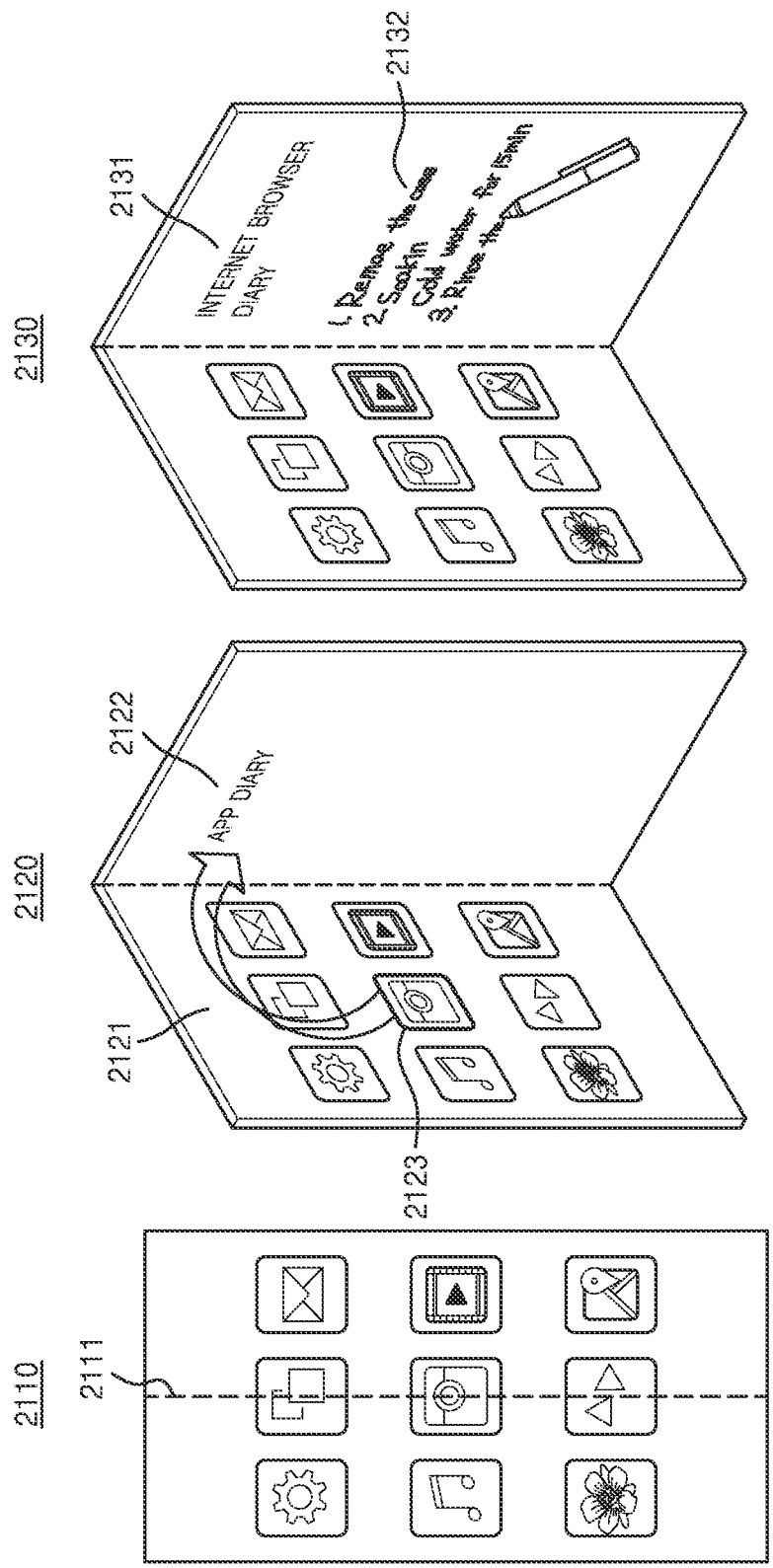
FIG. 21 is a diagram illustrating an example of bending an electronic device, according to an embodiment of the present disclosure.

FIG. 21 is a diagram illustrating an example of bending the electronic device 1000, according to an embodiment of the present disclosure.

Referring to 2110 and 2120 of FIG. 21, the electronic device 1000 may be bent about a central line 2111 of the display screen thereof. When the electronic device 1000 senses the bending of the display screen about the central line 2111, the display screen displayed before the bending of the electronic device 1000 may be displayed in reduced size on a display of a left area 2121, as shown in 2120 of FIG. 21.

For example, a wallpaper or a launcher screen, which includes a plurality of application icons, may be displayed on the display of the left area 2121. In addition, a user interface for generating a memo may be displayed on a display of a right area 2122.

According to an embodiment of the present disclosure, as in the example shown in 2130 of FIG. 21, an internet browser diary 2131, which is information representing an app diary where the memo is to be stored, may be displayed on the display of the right area 2122, according to a user input. For example, in the left area 2121, as a drag input 2123 in an arrow direction with respect to an icon of an internet browser is received, an internet browser app diary may be determined to be the app diary where the memo is to be stored, and the internet browser diary 2131 may be displayed on the right area 2122. The present disclosure is not limited to the drag input 2123, and the app diary where the memo is to be stored may be determined according to various user inputs.

Referring to 2130 of FIG. 21, in the right area 2122, contents to be generated into a memo may be input by a user. The memo may be generated based on information 2132 input by the user, and the generated memo may be stored in the internet browser diary 2131.

Figure 22:
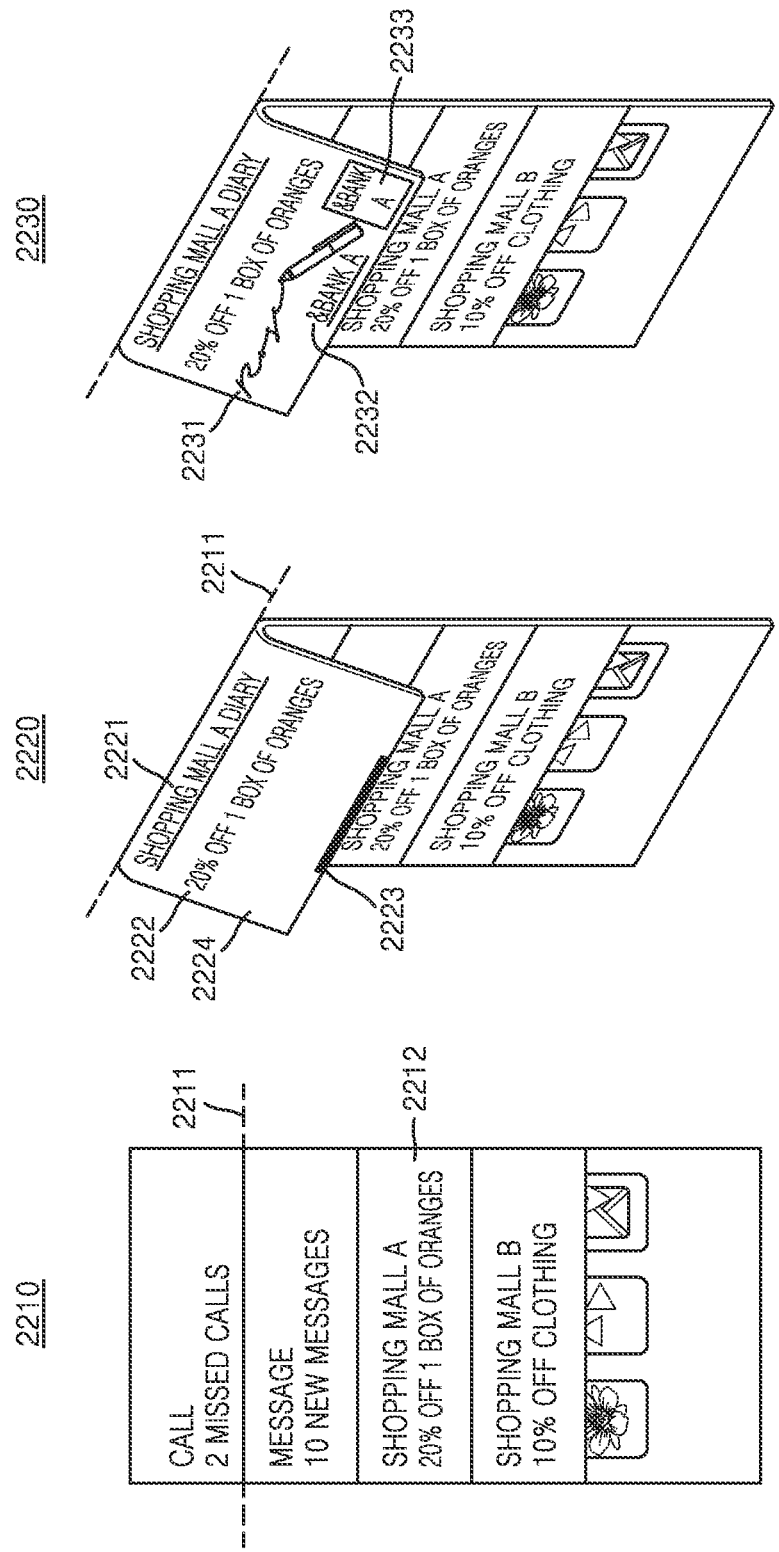
FIG. 22 is a diagram illustrating an example of bending an electronic device, according to an embodiment of the present disclosure.

FIG. 22 is a diagram illustrating an example of bending the electronic device 1000, according to an embodiment of the present disclosure.

Referring to 2210 of FIG. 22, the electronic device 1000 may be bent about a marked line 2211 of the display screen thereof. When the electronic device 1000 senses the bending of the display screen about the marked line 2211, the electronic device 1000 may identify that a bent region 2223 indicates an object 2212 including information about a shopping mall A app from among a plurality of objects displayed on the display of the electronic device 1000.

According to the embodiment shown in FIG. 22, the bent region 2223 indicating the object may be a region including a one-side edge except vertices rather than a region including one vertex.

According to an embodiment of the present disclosure, as shown in 2220 of FIG. 22, the electronic device 1000 may display information 2222 about the object 2212 indicated by the bent region 2223, on a display area 2224 of the bent region 2223. According to an embodiment of the present disclosure, as a display is folded as shown in 2220 of FIG. 22, a display area of a bent region may include a surface of the display, which faces from backward to forward.

In addition, information 2221 about an app diary of an application related to the object 2212 may be displayed on the display area 2224 of the bent region 2223. According to an embodiment of the present disclosure, a memo generated in the display area 2224 may be stored in the app diary 2221.

Referring to 2230 of FIG. 22, in addition to the information about the object 2212, other pieces of information input by a user may be further included in the memo. For example, information 2231 input by a touch by the user may be further included in the memo. In addition, pieces of information 2232 and 2233 about another application related to a memo that is input by the user may be further included in the memo. For example, the information 2232 input as "& (application name)" by the user may be processed as information about the other application related to the memo, and as a result of the processing, an icon 2233 representing the other application may be displayed.

Figure 23:
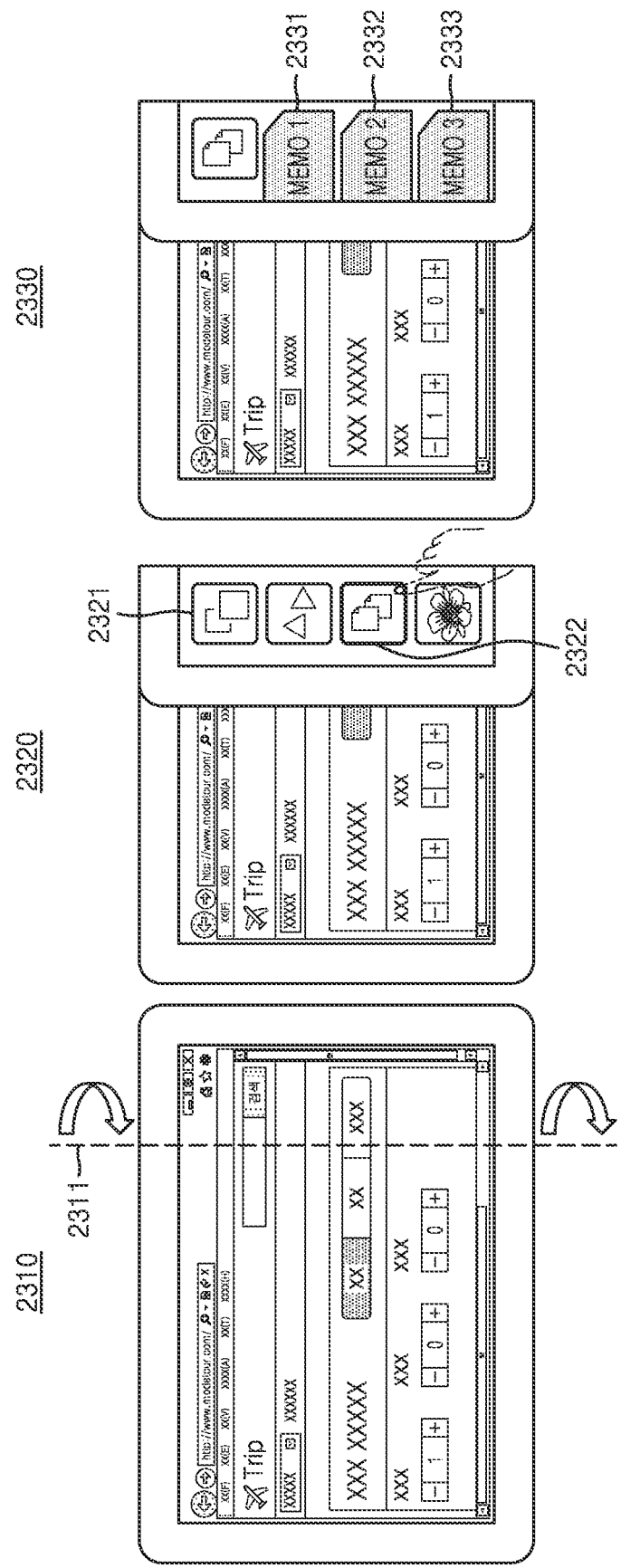
FIG. 23 is a diagram illustrating an example of bending an electronic device, according to an embodiment of the present disclosure.

FIG. 23 is a diagram illustrating an example of bending the electronic device 1000, according to an embodiment of the present disclosure.

Referring to 2310 of FIG. 23, the electronic device 1000 may be bent forward about a marked line 2311 of the display screen thereof. When the electronic device 1000 senses the bending of the display screen about the marked line 2311, the electronic device 1000 may display an application list 2321 on a surface of the display, which faces forward due to the bending of the display screen, as shown in 2320 of FIG. 23.

According to an embodiment of the present disclosure, the application list 2321 may include an application having an app diary in which a memo is stored.

In 2320 of FIG. 23, the electronic device 1000 may select an application 2322 from the application list 2321 according to a user input.

In 2330 of FIG. 23, the electronic device 1000 may display memos 2331, 2332, and 2333 stored in an app diary of the application 2322 selected from the application list 2321. According to an embodiment of the present disclosure, the memos 2331, 2332, and 2333 stored in the app diary of the application 2322 may be displayed on a surface of the display, which faces from backward to forward as the display screen is bent.

Figure 24:
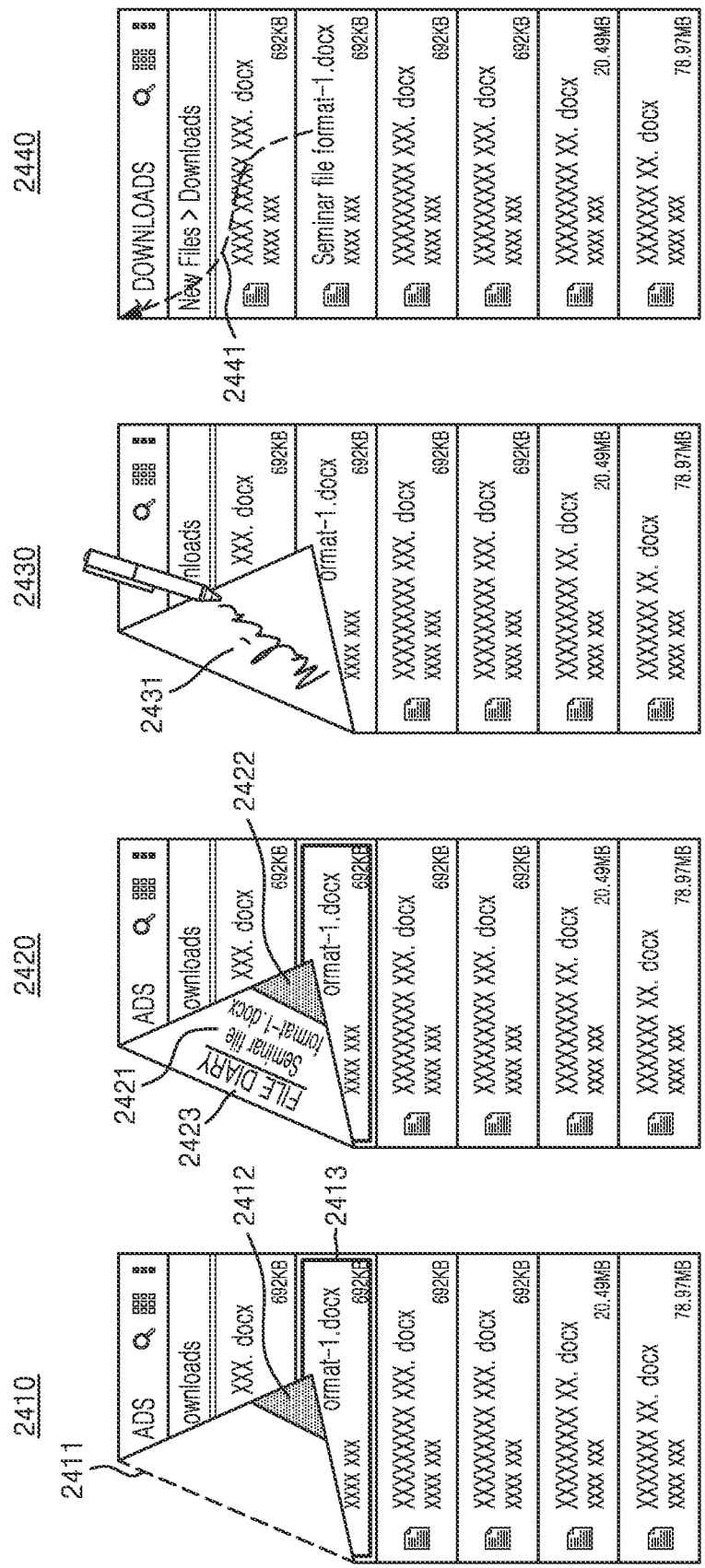
FIG. 24 is a diagram illustrating an example of generating a memo, according to an embodiment of the present disclosure.

FIG. 24 is a diagram illustrating an example of generating a memo, according to an embodiment of the present disclosure.

Referring to 2410 of FIG. 24, an execution screen of a file management application displaying files in the electronic device 1000 may be displayed. A plurality of files stored in the electronic device 1000 may be displayed on the execution screen of the file management application.

Referring to 2410 of FIG. 24, a certain region of the electronic device 1000 may be bent about a marked line 2411, and the bent region 2412 may indicate a file 2413 displayed on the execution screen of the file management application.

Referring to 2420 of FIG. 24, the electronic device 1000 may display identification information 2422 representing the file 2413 on a display screen area 2423 of the bent region 2412.

The identification information 2422 representing the file 2413 may include various types of information, for example, a file name, a representative image of a file, a file icon, and the like.

In addition, as in the example shown in 2430 of FIG. 24, according to an embodiment of the present disclosure, not only information about the file 2413 but also information 2431 input by a user may be further added to a memo.

As in the example shown in 2440 of FIG. 24, when a bending state of the electronic device 1000 is released as a bent region moves in an arrow direction 2441, the electronic device 1000 may determine that memo writing is completed, and may generate and store a memo including the information related to the file 2413 and the information 2431 input by the user. The memo generated by the electronic device 1000 may be added to an app diary 2421 of the file management application.

Figure 25:
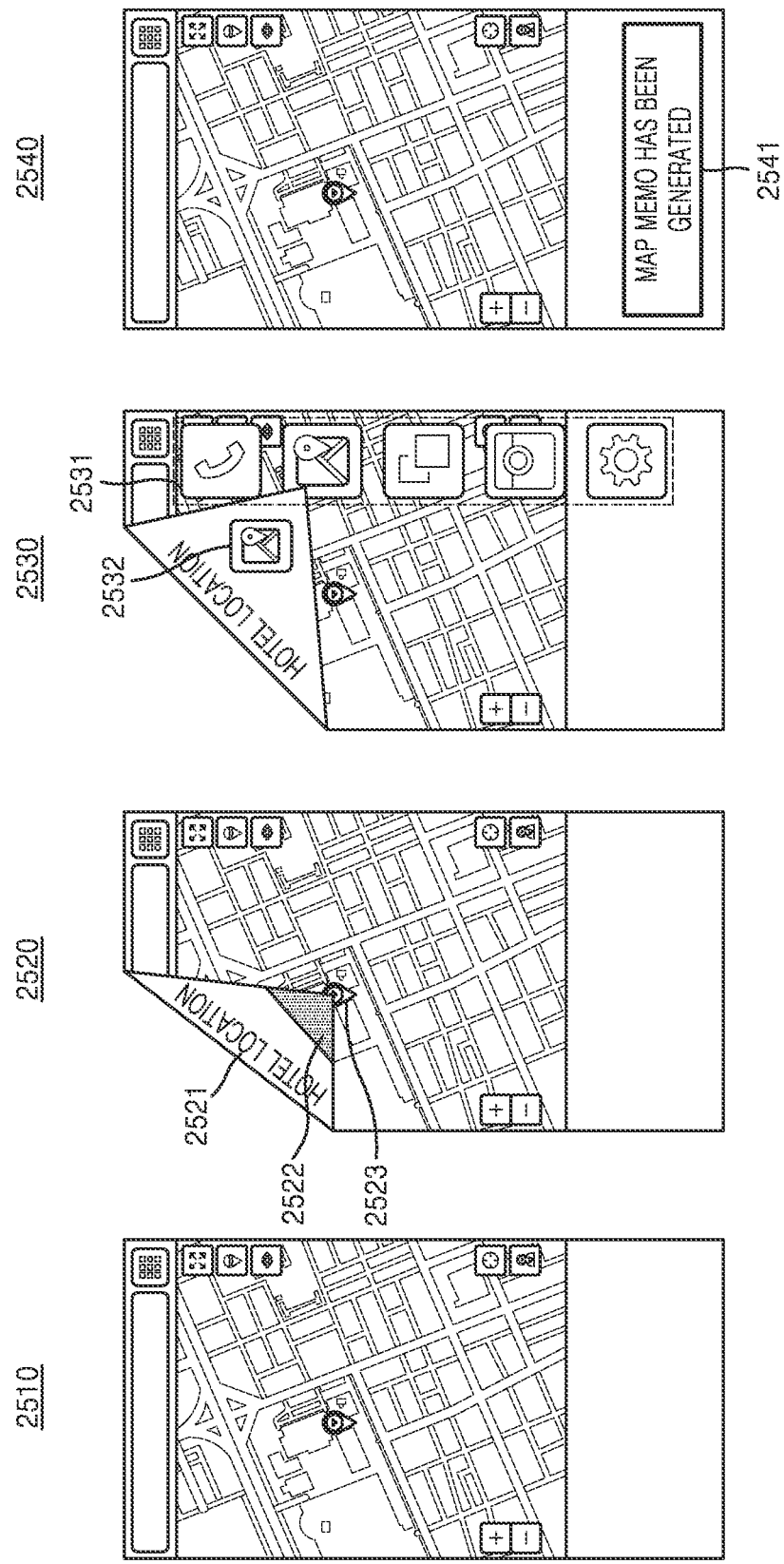
FIG. 25 is a diagram illustrating an example of generating a memo, according to an embodiment of the present disclosure.

FIG. 25 is a diagram illustrating an example of generating a memo, according to an embodiment of the present disclosure.

Referring to 2510 of FIG. 25, an execution screen of a map application may be displayed on the display screen of the electronic device 1000. The execution screen of the map application may display, for example, a map of an area specified by a user.

Referring to 2520 of FIG. 25, a certain region of the electronic device 1000 may be bent, and a bent region 2522 may indicate one of several locations on the map.

According to an embodiment of the present disclosure, before the electronic device 1000 is bent, at least one location on the map may be prespecified by the user. For example, according to a user input, at least one location on the map may be prespecified to be a location selected by the user. When the electronic device 1000 is bent, a location displayed closest to the bent region 2522 of the electronic device 1000 from among prespecified locations may be determined to be the location indicated by the bent region 2522.

In 2520 of FIG. 25, as the bent region 2522 indicates a location 2523 prespecified by the user, information related to the location 2523 may be displayed on a display area 2521 of the bent region 2522. In addition, the information related to the location 2523 may be additionally input by the user, and the input information may be displayed on the display area 2521 of the bent region 2522.

In 2530 of FIG. 25, according to a user input, an application list 2531 for selecting an application related to a memo that is to be generated may be displayed. According to an embodiment of the present disclosure, an application indicated by the bent region 2522 from among applications displayed in the application list 2531 may be selected to be an application related to the memo.

In 2540 of FIG. 25, as the map application is selected by the bent region 2522 and a bending state of the bent region 2522 is released, a memo including information displayed on the display area 2521 may be added to and stored in an app diary regarding the selected map application. For example, the memo may include information related to the location 2523 and information additionally input by the user when the memo is generated.

Figure 26:
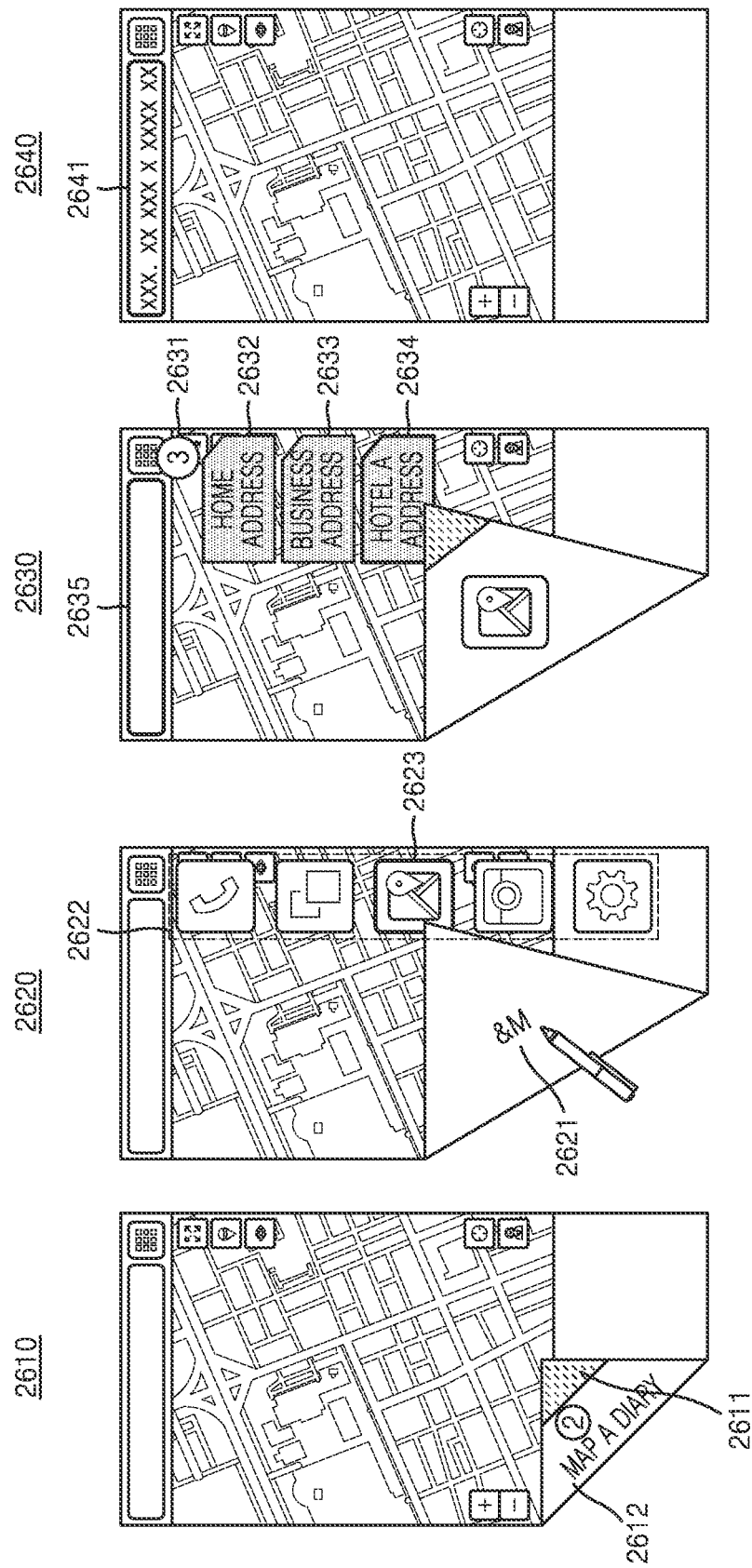
FIG. 26 is a diagram illustrating an example of retrieving a memo, according to an embodiment of the present disclosure.

FIG. 26 is a diagram illustrating an example of retrieving a memo, according to an embodiment of the present disclosure.

Referring to 2610 of FIG. 26, an execution screen of a map A application may be displayed on the display screen of the electronic device 1000.

Referring to 2610 of FIG. 26, a certain region of the electronic device 1000 may be bent. As a bent region 2611 corresponds to an operation of retrieving a memo, the electronic device 1000 may perform the operation of retrieving a memo.

According to an embodiment of the present disclosure, as the electronic device 1000 is bent, the electronic device 1000 may perform an operation of retrieving a memo stored in an app diary of the map A application that is currently displayed. As in the example shown in 2610 of FIG. 26, on a display area 2612 of the bent region 2611, information representing the app diary of the currently displayed map A application, and "2" that is the number of memos stored in the app diary of the currently displayed map A application may be displayed.

In 2620 of FIG. 26, according to a user input, the electronic device 1000 may perform an operation of retrieving a memo stored in an app diary of a different application from a currently displayed application. According to an embodiment of the present disclosure, as "&M" 2621 is input by a user, the electronic device 1000 may display a list 2622 of applications beginning with M, as shown in 2620 of FIG. 26.

According to an embodiment of the present disclosure, from the list 2622 of applications, an application indicated by the bent region 2611 may be selected by the user, or an application may be selected by a touch input by the user. The electronic device 1000 may perform an operation of retrieving a memo stored in an app diary of the selected application.

In 2630 of FIG. 26, as a map B application is selected by the bent region 2611, the number of memos 2631 stored in an app diary of the selected map B application, and memos 2632, 2633, and 2634 may be displayed.

According to an embodiment of the present disclosure, when the memo 2634 is selected, by the user, from among the memos 2632, 2633, and 2634 stored in the app diary of the map B application, information of the selected memo 2634 may be transferred to the map A application that is currently running. For example, the information of the selected memo 2634 may be inserted into an address area 2635 of the map A application. When address information is inserted into the address area 2635 of the map A application, a location on a map, which corresponds to the address information, may be displayed.

According to an embodiment of the present disclosure, an area of the map A application, into which the information of the selected memo 2634 is to be inserted, may be preset by the user, before the memo 2634 is selected.

Referring to 2640 of FIG. 26, the information of the selected memo 2634 is inserted into an address area 2641 of the map A application, whereby a location corresponding to the inserted address information may be displayed on the map A application.

FIG. 27 is a diagram illustrating an example of retrieving a memo, according to an embodiment of the present disclosure.

Referring to FIG. 27, in 2710 of FIG. 27, an execution screen of the map A application may be displayed on the display screen of the electronic device 1000.

According to an embodiment of the present disclosure, an area 2711 of the map A application may be preset to be an area into which a memo is to be inserted.

Referring to 2720 of FIG. 27, a certain region of the electronic device 1000 may be bent. As a bent region 2721 corresponds to an operation of retrieving a memo, the electronic device 1000 may perform the operation of retrieving a memo.

According to an embodiment of the present disclosure, as the electronic device 1000 is bent, the electronic device 1000 may perform an operation of retrieving a memo stored in an app diary of the map A application that is currently displayed. As in the example shown in 2720 of FIG. 27, on a display area 2721 of a bent region, information representing the app diary of the currently displayed map A application, and "2" that is the number of memos stored in the app diary of the currently displayed map A application may be displayed.

Referring to 2730 of FIG. 27, according to a user input, the number of memos 2732 stored in the app diary of the selected map A application, and memos 2733 and 2734 may be displayed.

According to an embodiment of the present disclosure, when the memo 2734 is selected by a user or a bent region 2731 from the memos 2733 and 2734 stored in the app diary of the map A application, information of the selected memo 2734 may be inserted into the map A application that is currently running. For example, the information of the selected memo 2734 may be inserted into the preset area 2711 of the map A application.

Referring to 2740 of FIG. 27, the information of the selected memo 2734 is inserted into the preset area 2711 of the map A application, whereby information 2741 representing a result thereof may be displayed on the screen of the electronic device 1000.

According to an embodiment of the present disclosure, as the information of the selected memo 2734 is a coupon code and the coupon code of the memo 2734 is inserted into the preset area 2711, a message 2741, which represents that a coupon of the memo is applied to a currently running application, may be displayed.

According to an embodiment of the present disclosure, a method of easily and intuitively performing various operations of an electronic device, based on bending, may be provided.

An embodiment of the present disclosure may be implemented in the form of a recording medium including instructions, which are capable of being executed by a computer, such as a program module executed by the computer. A computer-readable medium may be any available medium accessible by a computer and may include volatile and non-volatile media and separable and non-separable media. In addition, the computer-readable medium may include a computer storage medium and a communication medium. The computer storage medium includes volatile and non-volatile media and separable and non-separable media, which are implemented by any method or technique for storing information such as computer-readable instructions, data structures, program modules, or other data. The communication medium typically includes computer-readable instructions, data structures, or program modules and may include any information transfer medium.

In addition, the term such as " . . . unit" or " . . . portion" used herein may refer to a hardware component such as a processor or a circuit, and/or a software component executed by the hardware component such as a processor.

It will be understood by one of ordinary skill in the art that the embodiments of the present disclosure are provided for illustration and may be implemented in different ways without departing from the spirit and scope of the present disclosure. Therefore, it should be understood that the foregoing embodiments of the present disclosure are provided for illustrative purposes only and are not to be construed in any way as limiting the present disclosure. For example, each component described as a single type may be implemented in a distributed manner, and likewise, components described as being distributed may be implemented as a combined type.

The scope of the present disclosure should be defined by the appended claims and equivalents thereof, and any changes or modifications derived from the appended claims and equivalents thereof should be construed as falling within the scope of the present disclosure.

The invention claimed is:

1. A method, performed by an electronic device, of performing an operation based on bending, the method comprising:

sensing bending that deforms a shape of a display of the electronic device;

determining a first region, from which the bending is sensed, from among regions of the display;

identifying an area of the display touched by the first region;

selecting an object in the identified area from at least one object displayed on the display; and performing an operation on the selected object, wherein the first region corresponds to a corner of the display, and wherein the performing the operation on the selected object comprises:

displaying identification information representing a content of the selected object on a forward-facing display area faced forward by bending the display of the electronic device, receiving a memo in the forward-facing display area faced forward by bending the display of the electronic device, adding a memo based on the selected object to an app diary associated with the selected object, and in case that one or more previously added memo associated with the selected object exist, displaying the number of the previously added memo associated with the selected object on a forward-facing display area faced forward by bending the display of the electronic device.

2. The method of claim 1, wherein the first region is determined to be a bending-sensed portion of the display.

3. The method of claim 1, wherein the performing of the operation on the selected object comprises:

determining the operation corresponding to the first region; and performing the determined operation on the selected object.

4. The method of claim 1, wherein the performing of the operation on the selected object comprises:

determining an application related to the selected object; and performing the operation on the selected object, based on the determined application.

5. The method of claim 4, wherein the application related to the selected object is determined to be one of:

a currently running application; an application selected from a plurality of applications according to a user input; and an application represented by an application icon corresponding to the selected object.

6. The method of claim 4, wherein the performing of the operation on the selected object further comprises setting, by the determined application, the operation to be performed on the selected object, and an operation condition for the operation, and wherein, when the set operation condition is satisfied after the operation condition is set, the set operation is performed on the selected object, by the determined application.

7. An electronic device for performing an operation based on bending, the electronic device comprising:

a display;

a memory storing one or more instructions; and at least one processor configured to execute the one or more instructions stored in the memory, wherein the at least one processor is configured to execute the one or more instructions to:

sense bending that deforms a shape of the display, determine a first region, from which the bending is sensed, from among regions of the display, identify an area of the display touched by the first region, select an object in the identified area from at least one object displayed on the display, and perform an operation on the selected object, wherein the operation on the selected object further comprises:

displaying identification information representing a content of the selected object on forward-facing display area faced forward by bending the display of the electronic device, receiving a memo in the forward-facing display area faced forward by bending the display of the electronic device adding a memo based on the selected object to an app diary associated with the selected object, and in case that one or more previously added memo associated with the selected object exist, displaying the number of the previously added memo associated with the selected object on a forward-facing display area faced forward by bending the display of the electronic device.

8. The electronic device of claim 7, wherein the first region is determined to be a bending-sensed portion of the display.

9. The electronic device of claim 7, wherein the at least one processor is further configured to execute the one or more instructions to:

determine an operation corresponding to the first region, and perform the determined operation on the selected object.

10. The electronic device of claim 7, wherein the at least one processor is further configured to execute the one or more instructions to:

determine an application related to the selected object, and perform the operation on the selected object, based on the determined application.

11. The electronic device of claim 10, wherein the application related to the selected object is determined to be one of:

a currently running application; an application selected from a plurality of applications according to a user input; and an application represented by an application icon corresponding to the selected object.

12. The electronic device of claim 10, wherein the at least one processor is further configured to execute the one or more instructions to set, by the determined application, the operation to be performed on the selected object, and an operation condition for the operation, and wherein, when the set operation condition is satisfied after the operation condition is set, the set operation is performed on the selected object, by the determined application.

13. A computer program product comprising a non-transitory computer-readable recording medium configured to store one or more computer programs including instructions that, when executed by at least one processor, cause the at least one processor to control to perform the method of claim 1.

* * * * *